US012614200B2

(12) United States Patent
Morgan et al.

(10) Patent No.: US 12,614,200 B2
(45) Date of Patent: Apr. 28, 2026

(54) METHODS AND APPARATUS TO USE DOMAIN NAME SYSTEM CACHE TO MONITOR AUDIENCES OF MEDIA

(71) Applicant: The Nielsen Company (US), LLC, New York, NY (US)

(72) Inventors: William Morgan, Tampa, FL (US); Jose Mortensen, Oldsmar, FL (US); Kevin K. Gaynor, Sunnyvale, CA (US); Kevin Zollicoffer, Safety Harbor, FL (US)

(73) Assignee: The Nielsen Company (US), LLC, New York, NY (US)

( * ) Notice: Subject to any disclaimer, the term of this patent is extended or adjusted under 35 U.S.C. 154(b) by 469 days.

(21) Appl. No.: 17/977,919

(22) Filed: Oct. 31, 2022

(65) Prior Publication Data

US 2023/0214856 A1 Jul. 6, 2023

Related U.S. Application Data

(60) Provisional application No. 63/295,401, filed on Dec. 30, 2021.

(51) Int. Cl.
*G06Q 30/0201* (2023.01)
*H04L 61/4511* (2022.01)
(Continued)

(52) U.S. Cl.
CPC ...... *G06Q 30/0201* (2013.01); *H04L 61/4511* (2022.05); *H04L 67/02* (2013.01); *H04L 67/146* (2013.01); *H04L 67/535* (2022.05)

(58) Field of Classification Search
CPC .................................................. G06Q 30/0201
See application file for complete search history.

(56) References Cited

U.S. PATENT DOCUMENTS 6,108,637 A 8/2000 Blumenau
8,370,489 B2 2/2013 Mazumdar et al.
(Continued)

FOREIGN PATENT DOCUMENTS

DE 112021001671 T5 * 2/2023 ......... H04L 63/0823
EP 2638689 B1 * 10/2017 ............ H04L 41/50
WO WO-2005001603 A2 * 1/2005 .......... H04L 61/4511

OTHER PUBLICATIONS

N. Tziortziotis, Y. Qiu, M. Hue and M. Vazirgiannis, "Audience expansion based on user browsing history," 2021 International Joint Conference on Neural Networks (IJCNN), Shenzhen, China (Year: 2021).*

(Continued)

*Primary Examiner* — Jerry O'Connor
*Assistant Examiner* — Philip N Warner

(57) ABSTRACT
An example system includes: at least one memory; programmable circuitry; and instructions to cause the programmable circuitry to: cache a first ordered list of internet protocol (IP) addresses in a domain name system (DNS) cache; cache a second ordered list of IP addresses in the DNS cache; access a first server identifier from a first server associated with the first ordered set of IP addresses; access a second server identifier from a second server associated with the second ordered list of IP addresses; hash the first and second server identifiers to generate a user identifier; and store the user identifier as a cookie.

22 Claims, 14 Drawing Sheets

(51) Int. Cl.
| | |
|---|---|
| *H04L 67/02* | (2022.01) |
| *H04L 67/146* | (2022.01) |
| *H04L 67/50* | (2022.01) |

(56) References Cited

U.S. PATENT DOCUMENTS

| | | | | |
|---|---|---|---|---|
| 8,474,030 | B2 * | 6/2013 | Choi | G06F 21/41 |
| | | | | 726/10 |
| 8,504,702 | B2 * | 8/2013 | Diehl | H04L 61/4505 |
| | | | | 709/228 |
| 8,930,701 | B2 | 1/2015 | Burbank et al. | |
| 9,237,138 | B2 | 1/2016 | Bosworth et al. | |
| 9,881,053 | B2 * | 1/2018 | Stoica-Beck | G06F 16/248 |
| 10,305,934 | B2 * | 5/2019 | Reddy | H04L 67/568 |
| 2012/0096166 | A1 * | 4/2012 | Devarapalli | H04L 63/0281 |
| | | | | 709/226 |
| 2016/0125471 | A1 * | 5/2016 | Hsu | G06Q 30/0269 |
| | | | | 705/14.66 |
| 2017/0034591 | A1 * | 2/2017 | Ray | H04N 21/2668 |
| 2017/0046110 | A1 * | 2/2017 | He | H04L 67/02 |
| 2018/0197107 | A1 * | 7/2018 | Belous | G06N 5/022 |
| 2019/0052467 | A1 * | 2/2019 | Bettger | H04L 9/0643 |
| 2019/0199774 | A1 * | 6/2019 | Demsey | H04L 67/04 |
| 2019/0229995 | A1 * | 7/2019 | Rao | H04L 43/12 |
| 2020/0099682 | A1 * | 3/2020 | Alexander | H04L 63/105 |
| 2020/0177467 | A1 * | 6/2020 | Ramachandran | H04L 43/04 |
| 2020/0403844 | A1 * | 12/2020 | Greene | G06F 16/9574 |
| 2021/0029081 | A1 * | 1/2021 | Jin | H04L 61/35 |
| 2021/0136075 | A1 * | 5/2021 | Sanghavi | H04L 63/101 |
| 2021/0297497 | A1 * | 9/2021 | Zohrob | H04L 67/563 |
| 2021/0409411 | A1 * | 12/2021 | Chen Kaidi | H04L 63/20 |
| 2022/0394336 | A1 * | 12/2022 | Christakopoulou | |
| | | | | H04N 21/252 |
| 2023/0199025 | A1 * | 6/2023 | Xu | H04L 63/0869 |
| | | | | 726/22 |

OTHER PUBLICATIONS

Klein et al., "DNS Cache-Based User Tracking," Proceedings 2019 Network and Distributed System Security Symposium, 15 pages.

\* cited by examiner

800

START

RETRIEVE MATCH QUERY FROM AME ⟋ 802

COMPARE AME COMPOUND USER ID TO A COMPOUND USER ID IN CENSUS IMPRESSION RECORDS ⟋ 804

DETERMINE AME COMPOUND USER ID AND CENSUS COMPOUND USER ID ARE FROM A SINGLE DEVICE ⟋ 806

END

METHODS AND APPARATUS TO USE DOMAIN NAME SYSTEM CACHE TO MONITOR AUDIENCES OF MEDIA

RELATED APPLICATION

This patent arises from an application that claims the benefit of U.S. Provisional Patent Application No. 63/295,401, which was filed on Dec. 30, 2021. U.S. Provisional Patent Application No. 63/295,401 is hereby incorporated herein by reference in its entirety. Priority to U.S. Provisional Patent Application No. 63/295,401 is hereby claimed.

FIELD OF THE DISCLOSURE

This disclosure relates generally to computer-based audience measurement and, more particularly, to methods and apparatus to use domain name system cache to monitor audiences of media.

BACKGROUND

Monitoring user access to digital media has been used by broadcasters and advertisers to determine viewership information for the digital media. Digital media is also known as Internet-accessible media. Monitoring viewership of digital media can present useful information to broadcasters and advertisers when determining placement strategies for digital advertising. The success of advertisement placement strategies is dependent on the accuracy that technology can achieve in generating audience metrics.

Figure 1:
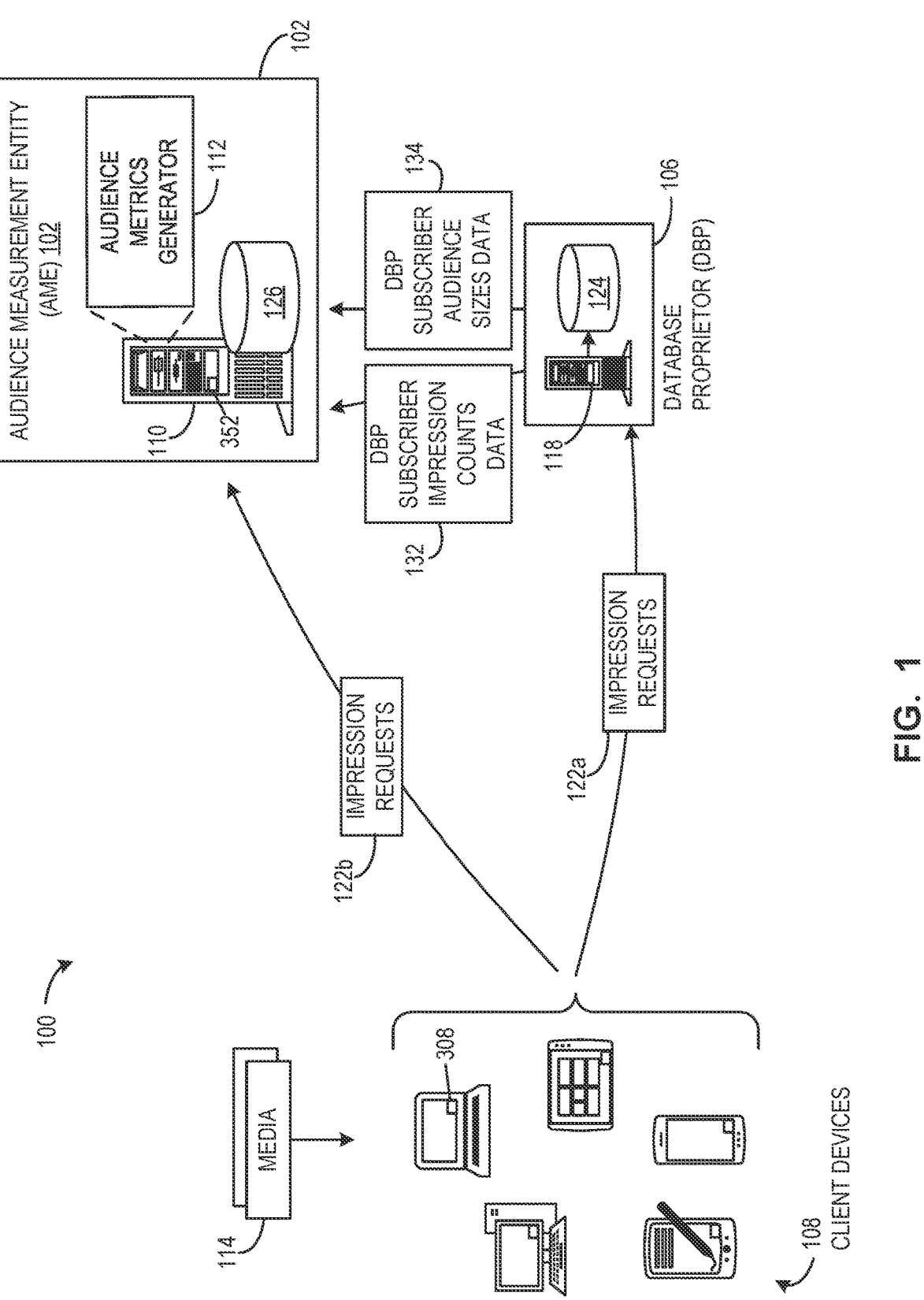
FIG. 1 is an example system for logging impressions of media accessed via client devices.

In general, the same reference numbers will be used throughout the drawing(s) and accompanying written description to refer to the same or like parts. The figures are not to scale. As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

As used herein, "approximately" and "about" refer to dimensions that may not be exact due to manufacturing tolerances and/or other real world imperfections. As used herein "substantially real time" refers to occurrence in a near instantaneous manner recognizing there may be real world delays for computing time, transmission, etc. Thus, unless otherwise specified, "substantially real time" refers to being within a one-second time frame of real time.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmed with instructions to perform specific operations and including one or more semiconductor-based logic devices (e.g., electrical hardware implemented by one or more transistors). Examples of processor circuitry include programmed microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of the processing circuitry is/are best suited to execute the computing task(s).

DETAILED DESCRIPTION

Techniques for monitoring user accesses to Internet-accessible media, such as advertisements and/or content, via digital televisions, desktop computers, mobile devices, etc. have evolved significantly over the years. Internet-accessible media is also known as digital media. In the past, such monitoring was done primarily through server logs. In particular, entities serving media on the Internet would log the number of requests received for media at their servers. Basing Internet usage research on server logs is problematic for several reasons. For example, server logs can be tampered with either directly or via zombie programs, which repeatedly request media from the server to increase the server log counts. Also, media is sometimes retrieved once, cached locally and then repeatedly accessed from the local cache without involving the server. Server logs cannot track such repeat views of locally cached media. Thus, server logs are susceptible to both over-counting and under-counting errors.

The inventions disclosed in Blumenau, U.S. Pat. No. 6,108,637, which is hereby incorporated herein by reference in its entirety, fundamentally changed the way Internet monitoring is performed and overcame the limitations of the server-side log monitoring techniques described above. For example, Blumenau disclosed a technique wherein Internet media to be tracked is tagged with monitoring instructions. In particular, monitoring instructions are associated with the hypertext markup language (HTML) of the media to be tracked. When a client requests the media, both the media and the monitoring instructions are downloaded to the client. The monitoring instructions are, thus, executed whenever the media is accessed, be it from a server or from a cache. Upon execution, the monitoring instructions cause the client to send or transmit monitoring information from the client to a content provider site. The monitoring information is indicative of the manner in which content was displayed.

In some implementations, an impression request or ping request can be used to send or transmit monitoring information by a client device using a network communication in the form of a hypertext transfer protocol (HTTP) request. In this manner, the impression request or ping request reports the occurrence of a media impression at the client device. For example, the impression request or ping request includes information to report access to a particular item of media (e.g., an advertisement, a webpage, an image, video, audio, etc.). In some examples, the impression request or ping request can also include a cookie previously set in the browser of the client device that may be used to identify a user that accessed the media. That is, impression requests or ping requests cause monitoring data reflecting information about an access to the media to be sent from the client device that downloaded the media to a monitoring entity and can provide a cookie to identify the client device and/or a user of the client device. In some examples, the monitoring entity is an audience measurement entity (AME) that did not provide the media to the client and who is a trusted (e.g., neutral) third party for providing accurate usage statistics (e.g., The Nielsen Company, LLC). Since the AME is a third party relative to the entity serving the media to the client device, the cookie sent to the AME in the impression request to report the occurrence of the media impression at the client device is a third-party cookie. Third-party cookie tracking is used by measurement entities to track access to media accessed by client devices from first-party media servers.

There are many database proprietors operating on the Internet. These database proprietors provide services to large numbers of subscribers. In exchange for the provision of services, the subscribers register with the database proprietors. Examples of such database proprietors include social network sites (e.g., Facebook, Twitter, MySpace, etc.), multi-service sites (e.g., Yahoo!, Google, Axiom, Catalina, etc.), online retailer sites (e.g., Amazon.com, Buy.com, etc.), credit reporting sites (e.g., Experian), streaming media sites (e.g., YouTube, Hulu, etc.), etc. These database proprietors set cookies and/or other device/user identifiers on the client devices of their subscribers to enable the database proprietors to recognize their subscribers when those subscribers visit web sites of the database proprietors.

The protocols of the Internet make cookies inaccessible outside of the domain (e.g., Internet domain, domain name, etc.) on which they were set. Thus, a cookie set in, for example, the facebook.com domain (e.g., a first party) is accessible to servers in the facebook.com domain, but not to servers outside that domain. Therefore, although an AME (e.g., a third party) might find it advantageous to access the cookies set by the database proprietors, they are unable to do so.

The inventions disclosed in Mazumdar et al., U.S. Pat. No. 8,370,489, which is incorporated by reference herein in its entirety, enable an AME to leverage the existing databases of database proprietors to collect more extensive Internet usage by extending the impression request process to encompass partnered database proprietors and by using such partners as interim data collectors. The inventions disclosed in Mazumdar accomplish this task by structuring the AME to respond to impression requests from client devices (who may not be a member of an audience measurement panel and, thus, may be unknown to the AME) by redirecting the client devices from the AME to a database proprietor, such as a social network site partnered with the AME, using an impression response. Such a redirection initiates a communication session between the client device accessing the tagged media and the database proprietor. For example, the impression response received at the client device from the AME may cause the client device to send a second impression request to the database proprietor. In response to the database proprietor receiving this impression request from the client device, the database proprietor (e.g., Facebook) can access any cookie it has set on the client device to thereby identify the client device based on the internal records of the database proprietor. In the event the client device corresponds to a subscriber of the database proprietor, the database proprietor logs/records a database proprietor demographic impression in association with the user/client device.

As used herein, an impression is defined to be an event in which a home or individual accesses and/or is exposed to media (e.g., an advertisement, content, a group of advertisements and/or a collection of content). In Internet media delivery, a quantity of impressions or impression count is the total number of times media (e.g., content, an advertisement, or advertisement campaign) has been accessed by a web population or audience members (e.g., the number of times the media is accessed). In some examples, an impression or media impression is logged by an impression collection entity (e.g., an AME or a database proprietor) in response to an impression request from a user/client device that requested the media. For example, an impression request is a message or communication (e.g., an HTTP request) sent by a client device to an impression collection server to report the occurrence of a media impression at the client device. In some examples, a media impression is not associated with demographics. In non-Internet media delivery, such as television (TV) media, a television or a device attached to the television (e.g., a set-top-box or other media monitoring device) may monitor media being output by the television. The monitoring generates a log of impressions associated with the media displayed on the television. The television and/or connected device may transmit impression logs to the impression collection entity to log the media impressions.

A user of a computing device (e.g., a mobile device, a tablet, a laptop, etc.) and/or a television may access the same media via multiple devices (e.g., two or more of a mobile device, a tablet, a laptop, etc.) and/or via multiple media types (e.g., digital media available online, digital TV (DTV) media temporarily available online after broadcast, TV media, etc.). For example, a user may start watching a particular television program on a television as part of TV media, pause the program, and continue to watch the program on a tablet as part of DTV media. In such an example, the access of the program may be logged by an AME twice, once for an impression log associated with the television access, and once for the impression request generated by a tag (e.g., census measurement science (CMS) tag) executed on the tablet. Multiple logged impressions associated with the same program and/or same user are defined as duplicate impressions. Duplicate impressions are problematic in determining total reach estimates because one exposure via two or more cross-platform devices may be counted as two or more unique audience members. As used herein, reach is a measure indicative of the demographic coverage achieved by media (e.g., demographic group(s) and/or demographic population(s) exposed to the media). For example, media reaching a broader demographic base will have a larger reach than media that reached a more limited demographic base. The reach metric may be measured by tracking impressions for known users (e.g., panelists or non-panelists) for which an audience measurement entity stores demographic information or can obtain demographic information. Deduplication is a process that is used to adjust cross-platform media exposure totals by reducing (e.g., eliminating) the double counting of individual audience members that were exposed to media via more than one platform and/or are represented in more than one database of media impressions used to determine the reach of the media.

As used herein, a unique audience is based on audience members distinguishable from one another. That is, a particular audience member exposed to particular media is measured as a single unique audience member regardless of how many times that audience member accesses that particular media or the particular platform(s) through which the audience member accessed the media. If that particular audience member accesses the same media multiple times, the multiple accesses by the particular audience member to the same media is counted as only a single unique audience member. As used herein, an audience size is a quantity of unique audience members of particular events (e.g., an access of particular media, etc.). That is, an audience size is a number of deduplicated or unique audience members that accessed a media item of interest of audience metrics analysis. A deduplicated or unique audience member is one that is counted only once as part of an audience size. Thus, regardless of whether a particular person is detected as accessing a media item once or multiple times, that person is only counted once as the audience size for that media item. In this manner, impression performance for particular media is not disproportionately represented when a small subset of one or more audience members accesses the same media an excessively large number of times while a larger number of audience members accesses that same media fewer times or not at all. Audience size may also be referred to as unique audience or deduplicated audience. By tracking media accesses by unique audience members, a unique audience measure may be used to determine a reach measure to identify how many unique audience members are reached by media. In some examples, increasing unique audience and, thus, reach, is useful for advertisers wishing to reach a larger audience base.

Notably, although third-party cookies are useful for third-party measurement entities in many of the above-described techniques to track media accesses and to leverage demographic information from third-party database proprietors, use of third-party cookies may be limited or may cease in some or all online markets. That is, use of third-party cookies enables sharing anonymous subscriber information (without revealing personally identifiable information (PII)) across entities which can be used to identify and deduplicate audience members across database proprietor impression data. However, to reduce or eliminate the possibility of revealing user identities outside database proprietors by such anonymous data sharing across entities, some websites, internet domains, and/or web browsers will stop (or have already stopped) supporting third-party cookies. This will make it more challenging for third-party measurement entities to track media accesses via first-party servers. That is, although first-party cookies will still be supported and useful for media providers to track accesses to media via their own first-party servers, neutral third parties interested in generating neutral, unbiased audience metrics data will not have access to the impression data collected by the first-party servers using first-party cookies. Examples disclosed herein may be implemented with or without the availability of third-party cookies, and facilitate cross-site monitoring of audience members when third-party cookies are not available.

An AME can generate estimates of unique audience sizes of media programs and advertising. Although media panels are effective at measuring media content and advertisements with large audiences—like those typically observed on TV and Radio—digital media audiences are difficult to measure with panels since fragmentation, addressable advertising and content recommendations, and generally more media options lead to smaller distributed audience sizes. The industry has attempted to solve this problem through cross-site tracking technologies like cookies and Advertiser Identifiers, which associate media impressions with persistent identifiers that represent devices owned by audience members. Unfortunately, cross-site tracking technologies—specifically identifiers (e.g., third-party cookies) that are broadly accessible without express user action—can be used to invade a user's privacy by tracking their behavior (e.g., tracking websites they visit). Accordingly, some digital device OEMs and browser manufacturers are restricting or eliminating these technologies/IDs. Examples disclosed herein generate an ID that can be used by an AME to calculate unique audiences without providing utility for cross-site tracking, thereby addressing privacy concerns impacting the historical IDs used for measurement.

In census-based measurement products in which user-anonymity exists, AMEs have historically relied on longitudinal identifiers (cookies, device IDs, mobile ad IDs, hashed emails, etc.). These identifiers allow for tracking a person across sites and apps, which is useful for estimating a unique audience across sites and apps. However, they can also lead to concerns related to allowing the tracking of users across the web and app ecosystems. Recently, these longitudinal identifiers have been heavily scrutinized by device manufacturers seeking to promote user privacy.

In some examples, a database proprietor may target ads to users based on a user profile that is created from past and future activity. Prior user tracking solutions have often relied on longitudinal trackers (e.g., third-party cookies). Third-party cookies allow monitoring instructions, inserted by a database proprietor and/or a media entity, to identify a user viewing a site and serve an advertisement to the user. As described above, there has been increasing interest in user privacy, as evidenced by privacy laws (e.g., General Data Protection Regulation (GDPR), California Consumer Privacy Act (CCPA), etc.) and by companies offering innovative privacy features.

The increasing interest in privacy has led web browsers to prevent and/or mitigate user tracking and enhance user privacy features. Many modern web browsers now limit user tracking, making traditional cross-site tracking methods challenging. For example, audience measurement entities and/or database proprietors often use third-party cookies to track users across sites. However, in light of some browsers no longer allowing third-party cookies for cross-site user tracking, examples disclosed herein provide alternative methods of user tracking.

Examples disclosed herein combine DNS cookie methods and traditional browser cookies to successfully track users across sites. For example, a DNS cookie method of examples disclosed herein may cause information to be stored in a user DNS cache. A client device typically includes a single DNS cache (e.g., in operating system memory space). In examples disclosed herein, a DNS cache is a space in memory and/or storage in which a device (e.g., a computer, a smartphone, a server, etc.) saves DNS record(s) (e.g., a record that maps a URL to an IP address) of previously visited domain names to facilitate later retrieval of the DNS record(s). Thus, every time a client device performs a DNS resolution, the client device first checks the DNS cache in local memory before sending a DNS request to a DNS server (e.g., an authoritative name server, a database proprietor server, an AME server, etc.) to look up the IP address of the endpoint server/load-balancer. In examples disclosed herein, a DNS lookup is a process to translate a domain name to an IP address. In examples disclosed herein, a DNS resolution is a process by which a DNS record (e.g., a DNS entry) is obtained from a DNS server. Each DNS record also has a time-to-live (TTL) value attached to it, which indicates how long the DNS record is valid (e.g., 1 second, 100 seconds, 1000 seconds, etc.) before expiring and causing the example client device to send a second DNS request. This means that, until a DNS entry expires, whenever a client device is to send an HTTP communication (e.g., an HTTP request) to an endpoint for which a previous DNS resolution exists in the DNS cache, the client device communicates with the same endpoint (e.g., a same AME endpoint) identified in the DNS entry. That is, the DNS cache returns the same IP address for each subsequent DNS resolution request for the same endpoint. Examples disclosed herein utilize this characteristic of the DNS cache by having x number of AME domain names (e.g., domain names=1, 2, 3 . . . x) with each domain name corresponding to n number of web servers (e.g., servers=1, 2, 3 . . . n). In examples disclosed herein, a domain name is a string of text that is associated with two or more numeric IP addresses based on the rules and procedures of DNS. A single domain name may be associated with multiple servers. Therefore, when client devices resolve a domain name, they may be randomly assigned one of the servers.

In some examples, each server has a dedicated IP address and returns a server identifier (e.g., separate from an IP address) in a response (e.g., an HTTP response) to an impression request. An example of a server identifier is a static universally unique identifier (UUID). In examples disclosed herein, a UUID is a value or alphanumeric character string that identifies a server (e.g., an AME server). For example, each server returns its own UUID in response to an impression request by a client device. That is, a first UUID may be a binary string that is assigned to a first AME server. In such an example, the first UUID will be returned by the first AME server and will not be returned by any other AME servers.

Examples disclosed herein involve a client device and/or a browser executing monitoring instructions (e.g., instructions embedded in a resource and downloaded by the browser) that causes the client device and/or browser to transmit two or more DNS resolution requests (e.g., request an IP address for a given host) to a DNS server. The DNS server responds to the two or more DNS resolution requests with two or more lists (e.g., two or more randomly ordered lists) of IP addresses corresponding to AME and/or database proprietor servers (e.g., two or more AME endpoints) associated with the unique host name. The two or more lists of IP addresses are cached in the DNS cache of the client device. In some examples, the DNS resolution, and therefore the ordered list of IP addresses corresponding to a domain name, is cached by the client devices for a TTL value (e.g., an hour, a day, etc.) provided in response to a DNS resolution request.

In some examples, to report a media access to an AME, the client device transmits an impression request to a first one of the IP addresses corresponding to a first server of the AME in the ordered list of IP addresses. In response, the client device receives a UUID (e.g., an AME server identifier) from the AME server. Examples disclosed herein perform such operations over two or more AME servers, retrieving two or more unique values from the two or more AME servers.

The two or more UUIDs can be combined (e.g., concatenated), generating a user ID. For example, the two or more UUIDs can be combined (e.g., concatenated) to generate a compound user ID. In examples disclosed herein, a compound user ID is a combination (e.g., a concatenation) of two or more server identifiers (e.g., UUIDs). The user ID may identify the user across multiple sites. In some examples, a sha256 hash is performed on the resulting concatenated UUIDs (e.g., 12 UUIDs) to create the compound user ID. In some examples, the compound user ID is cast as a first-party cookie and cached for a threshold duration based on the TTL value of a corresponding DNS resolution. In some examples, a first server identifier and a second server identifier may be concatenated to generate an alphanumeric string that is provided to a hash function.

As described above, to ensure the compound user IDs are not duplicated, monitoring instructions may cause a client device to request DNS resolutions for multiple domains and/or hosts operated by the AME. To avoid unnecessary web requests, examples disclosed herein may cast the compound user ID as a first-party cookie with a TTL value similar to the TTL value of the corresponding DNS resolution. In this way, a browser and/or an SDK instrumented app can check for the presence of the cookie before sending such web requests.

In some examples, media access on a single site may be facilitated by generating a compound user ID and casting the compound user ID as a first-party cookie. Disclosed examples may also facilitate cross-site tracking by executing monitoring instructions to generate a compound user ID for each site visited. The user can be consistently identified, as the generated compound user ID will be the same as long as a DNS cache of the user's device is unchanged.

FIG. 1 shows an example operating environment 100 that includes an example audience measurement entity (AME) 102, an example database proprietor 106, and example client devices 108. The example AME 102 is a business entity that includes an example AME computer 110 that implements example audience metrics generator circuitry 112 to estimate total unique audience sizes based on census-level media impressions logged by the AME 102 and/or census-level total audience sizes logged by the AME 102 and based on database proprietor (DBP) aggregate subscriber-based audience metrics information provided by the database proprietor 106. In the illustrated example of FIG. 1, the AME computer 110 may also implement an impression monitor system to log media impressions reported by the client devices 108. In the illustrated example of FIG. 1, the client devices 108 may be stationary or portable computers, hand-held computing devices, smart phones, Internet appliances, and/or any other type of device that may be connected to the Internet and capable of presenting media. Some of the example client devices 108 include an example on-device meter 308. However, the techniques disclosed herein do not require the use of an on-device meter or third-party cookies to identify a user. For example, the AME computer 110 may provide monitoring instructions to the client devices 108. The example AME computer 110 may then (e.g., via the example DNS management circuitry 352) use characteristics of the DNS cache to generate a compound user ID to identify a user.

As used herein, an audience size is defined as a number of deduplicated or unique audience members exposed to a media item of interest for audience metrics analysis. A deduplicated or unique audience member is one that is counted only once as part of an audience size. Thus, regardless of whether a particular person is detected as accessing a media item once or multiple times, that person is only counted once in the audience size for that media item. Audience size may also be referred to as unique audience or deduplicated audience.

As used herein, a media impression is defined as an occurrence of access and/or exposure to media 114 (e.g., an advertisement, a movie, a movie trailer, a song, a webpage banner, a webpage, etc.). Examples disclosed herein may be used to monitor for media impressions of any one or more media types (e.g., video, audio, a webpage, an image, text, etc.). In examples disclosed herein, the media 114 may be content and/or advertisements. Examples disclosed herein are not restricted for use with any particular type of media. On the contrary, examples disclosed herein may be implemented in connection with tracking impressions for media of any type or form.

In the illustrated example of FIG. 1, content providers and/or advertisers distribute the media 114 via the Internet to users that access websites and/or online television services (e.g., web-based TV, Internet protocol TV (IPTV), etc.). In some examples, the media 114 is served by media servers of the same internet domains as the database proprietor 106. For example, the database proprietor 106 includes a database proprietor server 118 that can serve media 114 to its corresponding subscribers (or non-subscribers) via the client devices 108. Examples disclosed herein can be used to generate audience metrics data that measures audience sizes of media served by the database proprietor 106 and/or any other entity. For example, the database proprietor 106 may use such audience metrics data to promote its online media serving services (e.g., ad server services, media server services, etc.) to prospective clients. By showing audience metrics data indicative of audience sizes drawn by the database proprietor 106, the database proprietor 106 can sell its media serving services to customers interested in delivering online media to users.

The media 114 is then presented via the client devices 108. When the media 114 is accessed by the client devices 108, the client devices 108 send impression requests 122a to the database proprietor server 118 to inform the database proprietor server 118 of the media accesses. In this manner, the database proprietor server 118 can log media impressions in impression records of a database proprietor audience metrics database 124. In some examples, the client devices 108 also send impression requests 122b to the AME 102 so that the AME 102 can log census impressions in an AME audience metrics database 126. In the illustrated example of FIG. 1, the database proprietor 106 logs demographic impressions corresponding to accesses by the client devices 108 to the media 114. Demographic impressions are impressions logged in association with demographic information collected by the database proprietor 106 from registered subscribers of its services. Also, in the illustrated example of FIG. 1, the AME computer 110 logs census-level media impressions corresponding to accesses by client devices 108 to media 114. Census-level media impressions (e.g., census impressions) are impressions logged regardless of whether demographic information is known for those logged impressions. In some examples, the AME computer 110 also logs census-level audience size(s) corresponding to accesses by client device 108 to media 114. A census-level audience size (e.g., census audiences) indicates a quantity of audience members attributable to the census impressions regardless of whether demographic information is known for those audience members. In some examples, the AME computer 110 deduplicates the census-level audience size (e.g., an audience member corresponding to multiple impressions in the census impressions is counted only once in the census-level audience size regardless of the number of impressions attributable to that audience member).

In some examples, the media 114 is encoded to include a media identifier (ID). The media ID may be any identifier or information that can be used to identify the corresponding media 114. In some examples the media ID is an alphanumeric string or value. In some examples, the media ID is a collection of information. For example, if the media 114 is an episode, the media ID may include program name, season number, and episode number. When the media 114 includes advertisements, such advertisements may be content and/or advertisements. The advertisements may be individual, standalone advertisements and/or may be part of one or more ad campaigns. The advertisements of the illustrated example are encoded with identification codes (e.g., data) that identify the associated ad campaign (e.g., campaign ID, if any), a creative type ID (e.g., identifying a Flash-based ad, a banner ad, a rich type ad, etc.), a source ID (e.g., identifying the ad publisher), and/or a placement ID (e.g., identifying the physical placement of the ad on a screen). In some examples, advertisements tagged with the monitoring instructions are distributed with Internet-based media content such as, for example, web pages, streaming video, streaming audio, IPTV content, etc. As noted above, methods, apparatus, systems, and/or articles of manufacture disclosed herein are not limited to advertisement monitoring but can be adapted to any type of media monitoring (e.g., web pages, movies, television programs, etc.).

In some examples, the media 114 of the illustrated example is tagged or encoded to include monitoring instructions or tag instructions, which are computer executable instructions (e.g., Java, java script, or any other computer language or script) that are executed by web browsers that access the media 114 via, for example, the Internet. Execution of the monitoring instructions causes the web browser to send the impression requests 122*a,b* (e.g., also referred to as tag requests) to two or more specified servers of the AME 102 and/or the database proprietor 106. As used herein, tag requests 122*a,b* are used by the client devices 108 to report occurrences of media impressions caused by the client devices 108 accessing the media 114. In the illustrated example, the tag requests 122*a* include user-identifying information that the database proprietor 106 can use to identify the subscriber that accessed the media 114. For example, when a subscriber of the database proprietor 106 logs into a server of the database proprietor 106 via a client device 108, that server of the database proprietor 106 sets a database proprietor cookie on the client device 108 and maps that cookie to the subscriber's identity/account information at the database proprietor server 118. In examples disclosed herein, subscriber identity and/or subscriber account information includes personally identifiable information (PII) such as full name, street address, residence city and state, telephone numbers, email addresses, ages, dates of birth, social security numbers, demographic information, and/or any other personal information provided by subscribers in exchange for services from the database proprietor 106. By having such PII information mapped to database proprietor cookies, the database proprietor 106 can subsequently identify the subscriber based on the database proprietor cookie to determine when that user accessed different media 114 and to log an impression in association with demographics and/or other PII information of that user. In the illustrated example of FIG. 1, the impression requests 122*a* include database proprietor cookies of the client devices 108 to inform the database proprietor 106 of the particular subscribers that accessed the media 114. In some examples, the AME 102 also sets AME cookies in the client devices 108 to identify users that are enrolled in an AME panel of the AME 102 such that the AME 102 collects PII information of people that enroll in the panel by agreeing to having their internet activities monitored by the AME 102.

The tag requests 122*a,b* may be implemented using HTTP requests. However, whereas HTTP requests are network communications that traditionally identify web pages or other resources to be downloaded, the tag requests 122*a,b* of the illustrated example are network communications that include audience measurement information (e.g., ad campaign identification, media identifier, and/or user identification information) as their payloads. The server (e.g., the AME computer 110 and/or the database proprietor server 118) to which the tag requests 122*a,b* are directed is programmed to log occurrences of impressions reported by the tag requests 122*a,b*. Further examples of monitoring instructions (e.g., beacon instructions) and uses thereof to collect impression data are disclosed in U.S. Pat. No. 8,370,489 entitled "Methods and Apparatus to Determine Impressions using Distributed Demographic Information," which is hereby incorporated herein by reference in its entirety.

In other examples in which the media 114 is accessed by apps on mobile devices, tablets, computers, etc. (e.g., that do not employ cookies and/or do not execute instructions in a web browser environment), an app publisher (e.g., an app store) can provide a data collector (e.g., a software program or library to collect data) in an install package of an app for installation at the client devices 108. When a client device 108 downloads the app and consents to the accompanying data collector being installed at the client device 108 for purposes of audience/media/data analytics, the data collector can detect when the media 114 is accessed at the client device 108 and causes the client device 108 to send two or more of the impression requests 122*a,b* to report the access to the media 114. In such examples, the data collector can obtain user identifiers and/or device identifiers stored in the client devices 108 and send them in the impression requests 122*a,b* to enable the database proprietor 106 and/or the AME 102 to log impressions. Further examples of using a collector in client devices to collect impression data are disclosed in U.S. Pat. No. 8,930,701 entitled "Methods and Apparatus to Collect Distributed User Information for Media Impressions and Search Terms," and in U.S. Pat. No. 9,237,138 entitled "Methods and Apparatus to Collect Distributed User Information for Media Impressions and Search Terms," both of which are hereby incorporated herein by reference in their entireties.

In the illustrated example, the database proprietor 106 collaborates with the AME 102 so that the AME 102 can operate as an independent party that measures and/or verifies audience measurement information pertaining to the media 114 accessed by the subscribers of the database proprietor 106. However, the database proprietor 106 does so while protecting the privacies of its subscribers by not sharing or revealing subscriber identities, subscriber information, and/or any other subscriber PII information to outside parties. In examples disclosed herein, to share impression data with the AME 102 without revealing subscriber identities, subscriber information, and/or any other subscriber PII information, the database proprietor 106 processes its collected subscriber-level audience metrics information to generate database proprietor aggregate subscriber-based audience metrics information. In the example of FIG. 1, database proprietor aggregate subscriber-based audience metrics information is shown as example database proprietor subscriber impression counts data 132 and example database proprietor subscriber audience sizes data 134. The example database proprietor subscriber impression counts data 132 includes impression counts in the aggregate (e.g., no user-identifying PII data) per demographic category (e.g., a demographic group) for one or more media items of interest. The example database proprietor subscriber audience sizes data 134 includes unique audience sizes in the aggregate (e.g., no user-identifying PII data) per demographic category for one or more media items of interest.

Figure 2:
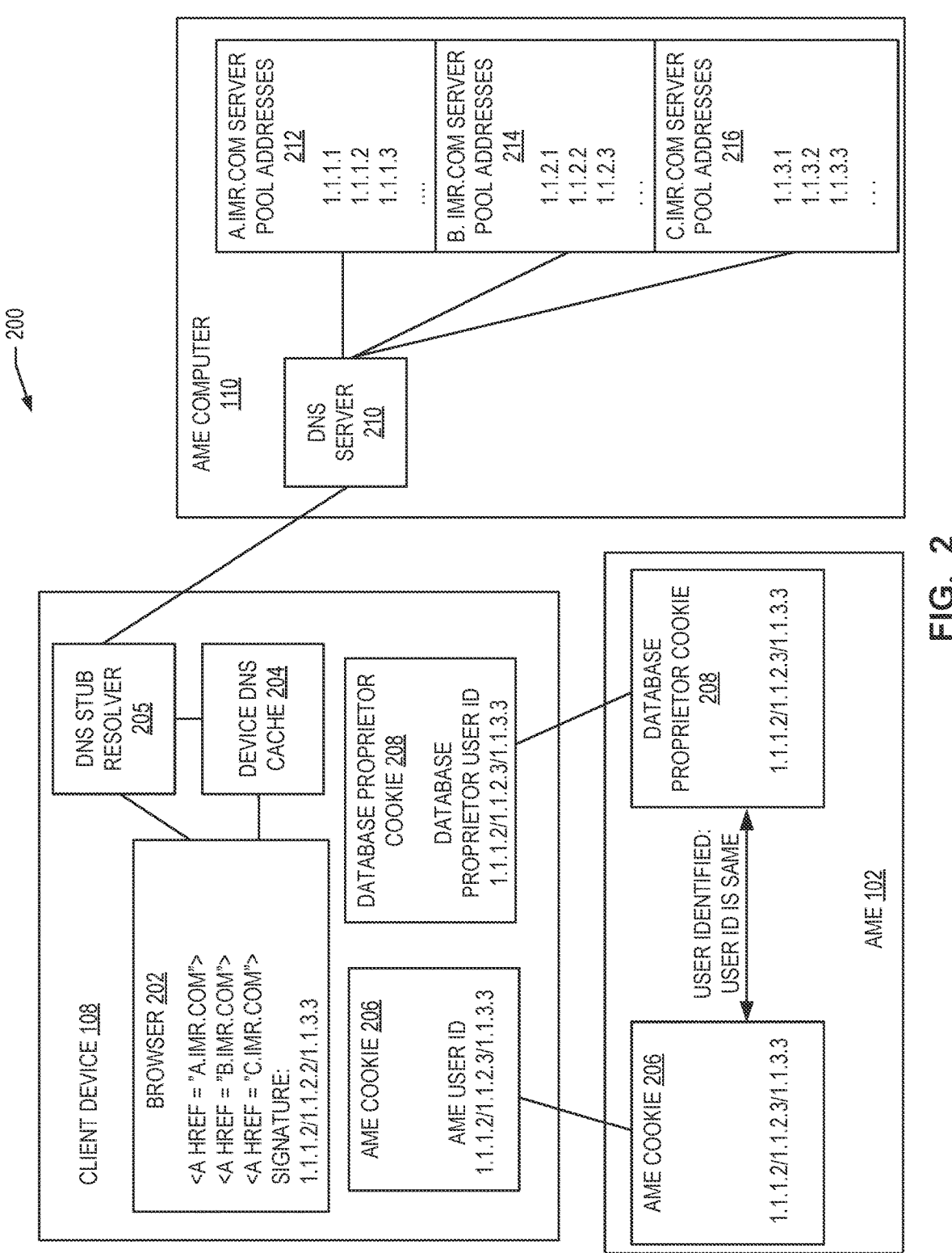
FIG. 2 is a block diagram of an example domain name system (DNS) cache-based audience monitoring system to monitor audience members of media accesses.

FIG. 2 is an example system 200 to perform DNS-based user tracking. The system 200 of FIG. 2 may be instantiated (e.g., creating an instance of, bring into being for any length of time, materialize, implement, etc.) by processor circuitry such as a central processor unit executing instructions. Additionally or alternatively, the system 200 of FIG. 2 may be instantiated (e.g., creating an instance of, bring into being for any length of time, materialize, implement, etc.) by an ASIC or an FPGA structured to perform operations corresponding to the instructions. It should be understood that some or all of the circuitry of FIG. 2 may, thus, be instantiated at the same or different times. Some or all of the circuitry may be instantiated, for example, in one or more threads executing concurrently on hardware and/or in series on hardware. Moreover, in some examples, some or all of the circuitry of FIG. 2 may be implemented by one or more virtual machines and/or containers executing on the microprocessor.

The example system 200 of FIG. 2 includes an example client device 108 and the example AME computer system 110 of FIG. 1. The example AME computer system 102 may include a plurality of servers including a DNS server 210, hosts, and/or endpoints including first server pool addresses 212, second server pool addresses 214, and/or third server pool addresses 216.

The example client device 108 further includes an example browser 202, an example device DNS cache 204, an example AME cookie 206, and an example database proprietor cookie 208.

The example browser 202 may render hypertext markup (HTML) pages and/or code from websites, received over HTTP/HTTPS. In the example system 200, the browser 202 executes monitoring instructions and interacts with a stub resolver of the client device 108 for DNS resolution of domains identified in the monitoring instructions. For example, an operating system DNS stub resolver 205 (e.g., with the device DNS cache 204) may perform DNS resolution via a system-level application programming interface (API) call and send a recursive DNS query over a network to a DNS resolver. In turn, the DNS stub resolver 205 may receive an answer from the DNS resolver, store the answer in a cache (e.g., the device DNS cache 204), and return data via the API call to the browser 202.

The example DNS server 210 and the example server pool addresses 212, 214, 216 may be operated by an AME 102. In examples disclosed herein, the DNS server 210 may be an authoritative DNS server responsible for multiple subdomains (e.g., a.imr.com, b.imr.com, c.imr.com) associated with a primary domain (e.g., imr.com). The example DNS server 210 may return a randomly ordered set of IP addresses associated with a domain (e.g. a.imr.com associated with 1.1.1.1; 1.1.1.2; 1.1.1.3) in response to a DNS query. Furthermore, some examples disclosed herein may use a plurality of domains and/or subdomains with different IP address sets used per subdomain.

For example, the AME computer system 102 and/or a database proprietor (e.g., the database proprietor 106 of FIG. 1) may operate several IP addresses (e.g. 1.1.1.1, 1.1.3.1, etc.), with a web server at each IP address awaiting impression requests. Each web server (e.g., bound to a different IP address) may return a unique identifier responsive to receiving an impression request (e.g., an HTTP communication) from the client device 108. Thus, requests to a single hostname can return different answers (e.g., different answers from different web servers). Example differences include differences between UUIDs, difference in IP addresses, differences in HTTP message body data, etc. The answers may be used to generate a compound user ID.

Such DNS resolution is associated with many HTTP requests and generates a large amount of traffic. Thus, examples disclosed herein generate a compound user ID based on casting the DNS resolution into a cookie. In this way, the cookie can be accessed rather than relying on repeated DNS resolution requests and subsequent impression requests to the IP addresses provided via the DNS resolutions.

Examples disclosed herein allow a single compound user ID (e.g., a fingerprint) to be accessed by both the AME computer 110 and the database proprietor 118 of FIG. 1. In some examples, a census system (e.g., operated by either the AME 102 or another party) can identify a user by matching the database proprietor cookie 208 (e.g., including the compound user ID) and the AME cookie 206 (e.g., including the same compound user ID).

Some examples disclosed herein may use one or more of the following operations to generate a unique compound user ID based on execution of monitoring instructions by a browser (e.g., the browser 202): (1) The browser 202 requests resolution of a domain name from an operating system; (2) A DNS stub resolver resolves the domain name into an IP address (e.g., by querying the DNS server 210 and/or the AME computer 110); (3) The AME computer 110 resolves the domain name and provides an answer (e.g., from an AME authoritative name server), the answer including a randomly ordered set of AME-associated IP addresses; (4) Cache the randomly ordered set of AME-associated IP addresses; (5) Send at least one impression request to the cached AME servers (e.g., server pool addresses 212, 214, 216); (6) Collect data values returned from the AME servers; (7) concatenate the data values based on a hash operation, generating a compound user ID; and (8) cast the compound user ID as a cookie.

Figure 3:
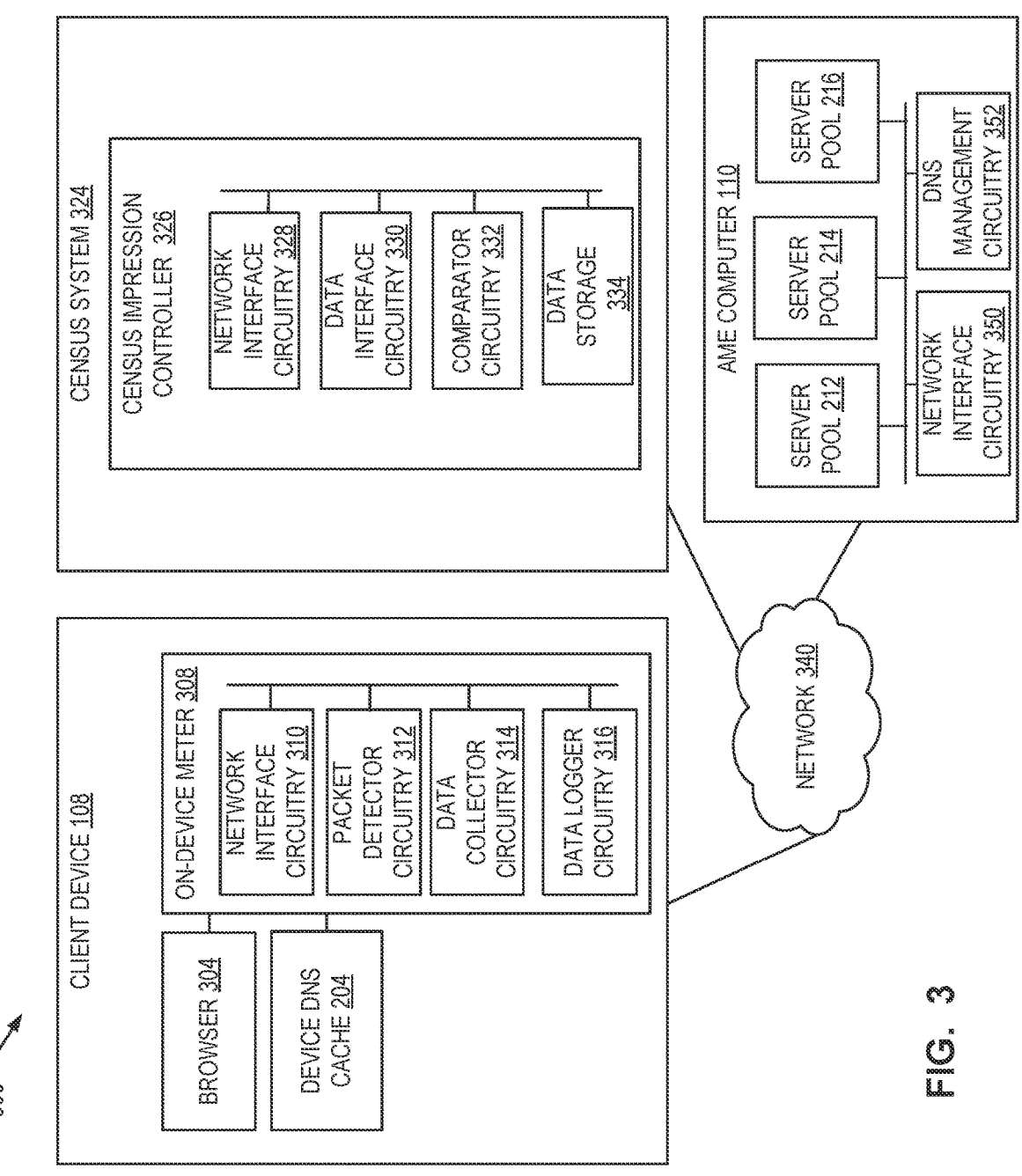
FIG. 3 is a block diagram of a client device, a census system, and an audience measurement entity (AME) operating in an example DNS cache-based audience monitoring system.

FIG. 3 is a block diagram of an example system 300 to use a domain name system to monitor audiences of media. The example system 300 to use a domain name system to monitor audiences of media may be instantiated (e.g., creating an instance of, bring into being for any length of time, materialize, implement, etc.) by processor circuitry such as a central processing unit executing instructions. Additionally or alternatively, the example system 300 to use a domain name system to monitor audiences of media may be instantiated (e.g., creating an instance of, bring into being for any length of time, materialize, implement, etc.) by an ASIC or an FPGA structured to perform operations corresponding to the instructions. It should be understood that some or all of the circuitry of FIG. 3 may, thus, be instantiated at the same or different times. Some or all of the circuitry may be instantiated, for example, in one or more threads executing concurrently on hardware and/or in series on hardware. Moreover, in some examples, some or all of the circuitry of FIG. 3 may be implemented by one or more virtual machines and/or containers executing on the microprocessor.

The example system 300 of FIG. 3 includes the example client device 108, the example AME computer 110, and an example census system 324. As shown in FIG. 3, the example client device 108, the example AME computer 110, and the example census system 324 are in communication via an example network 340 (e.g., the Internet). The example client device 108 includes an example on-device meter 308, an example browser 304, and the device DNS cache 204 of FIG. 2. The example on-device meter 308 includes example network interface circuitry 310, example packet detector circuitry 312, example data collector circuitry 314, and example data logger circuitry 316. The example AME computer 110 includes the example first server pool 212, the example second server pool 214, the example third server pool 216, example third network interface circuitry 350, and example DNS management circuitry 352. The example census system 324 includes an example census impression controller 326. The example census impression controller 326 includes example network interface circuitry 328, example data interface circuitry 330, example comparator circuitry 332, and example data storage circuitry 334.

The example client device 108 is a panelist client device because it includes the on-device meter 308 which is used to identify an AME panelist corresponding to the client device 108. Other client devices that do not belong to panelists are referred to herein as non-panelist client devices and do not include the on-device meter 308 but do include the browser 304 to access media, including media tagged with monitoring instructions. For non-panelist client devices, the browser 304 is capable of sending media impression requests to the census system 324 and/or the AME computer 110.

The example browser 304 may be any mobile or PC browser and executes monitoring instructions located in tagged media accessed by the client device 108. For example, monitoring instructions may be embedded in the tagged media as JavaScript instructions and/or any other type of suitable instructions. The example browser 304 may access, stream, or download the tagged media from a third-party server, for example, and execute the monitoring instructions (e.g., JavaScript code) which cause the browser 304 to send a ping request to the census system 324. In some examples, the third-party server embeds the monitoring instructions in the media.

The monitoring instructions may be provided by the AME 102 to media providers/publishers for use in embedding them into media and/or apps. The tagged media may also include media-identifying information (e.g., media identifiers, ad campaign identifiers, etc.) that is accessible by the browser 304 for placement into ping requests so that the census impression controller 326 can identify accessed media using the media-identifying information. This type of media-identifying information may be referred to as metadata. In some examples, metadata may include information related to the type of media viewed, the duration of media viewing, the number of times a panelist interacts with the media, etc. In some examples in which the census ping requests are implemented using HTTPS requests, the media-identifying information is encrypted in a URL parameter of a census ping request such that the on-device meter 308 cannot obtain the media-identifying information from the intercepted census ping request. As such, the on-device meter 308 cannot send the media-identifying information in the panelist impression records to the AME computer 110. However, the census impression controller 326 can decode the media-identifying information and log the media-identifying information in census impression records.

The example on-device meter 308 may intercept census ping requests from the browser 304. To allow the example on-device meter 308 to communicate with the AME computer 110, the on-device meter 308 includes the network interface circuitry 310. The example network interface circuitry 310 connects the on-device meter 308 to the network 340. In some examples, the network 340 may be the Internet. The example network interface circuitry 310 may be used to establish a virtual private network (VPN) interface or a proxy interface configured to intercept network communications (e.g., data packets) generated and/or sent by processes in the client device 108. The example network interface circuitry 310 may be implemented using a physical device (e.g., a network interface card (NIC), part of a system on a chip, etc.). In some examples, the network interface circuitry 310 may be implemented using software and/or may be virtualized. The example network interface circuitry 310 may also enable physical transmission of data packets containing media impression information (via wired or wireless connections) to the AME 102. The example first network interface circuitry 328 works in tandem with the packet detector circuitry 312 to send and receive these data packets.

The example packet detector circuitry 312 is configured to detect network packets intercepted by the first network interface circuitry 310 that include one or more characteristics of interest. For example, if the browser 304 specifies a domain of the census system 324 (e.g., https://imrworldwide.com) in a uniform resource locator (URL) of a census ping request, the packet detector circuitry 312 can identify network packets having that domain in the URL and can ignore network packets without that domain. The example packet detector circuitry 312 may also prepare packets for transmission by the first network interface circuitry 310. Additionally, the example packet detector circuitry 312 may identify streams of incoming data as packets containing a response from the AME computer 110. The identification may be based on information in the body of a HTTP response, for example.

The example data collector circuitry 314 collects media impression data and information about the client device 108. As mentioned above, this information may be related to the accessing of tagged media. Information recorded could include what media was accessed for the media impression, how long the media was accessed, how the media was interacted with, how many times the media was viewed, etc. In addition to this media impression data and any associated metadata, the example data collector circuitry 314 also collects information for identification of the device itself. This may include a public IP address (e.g., an external IP address), a private IP address (e.g., an internal IP address), a timestamp associated with a media access, and/or any other identifying data for submission to the example AME computer 110.

The example data logger circuitry 316 logs occurrences of intercepted census ping requests as panelist impression records in log files. Additionally or alternatively, the example data logger circuitry 316 can store the panelist impression records in a database of the client device 108. When it is time to send logs to the example AME 102 (e.g., at periodic or aperiodic intervals of every hour, every two hours, every 24 hours, changing durations, etc.), the example data logger circuitry 316 collects new log entries from a log file in local memory of the client device 108 that have been created since the last transfer to the AME computer 110, and sends the log file to the AME computer 110. In some examples, a log file can be created at a time of transferring new log entries to the AME computer 110 by retrieving log entries from a local database of the client device 108 and writing the log entries to the log file. The example first network interface circuitry 310 forwards intercepted census ping requests to the census system 324. The example first network interface circuitry 310 also sends log files of the logged panelist impression records and corresponding panelist impression information to the AME computer 110. The example data logger circuitry 316 may also receive data from the data collector circuitry 314, the browser 304, and/or the packet detector circuitry 312. The example data logger circuitry 316 may then package a panelist identifier, an IP address, a timestamp, metadata, and/or other data together as a panelist impression record. Each panelist impression record may then be placed in a log for transmission to the AME computer. Subsequently, the example AME computer 102 may send the panelist impression records to the example census impression controller 326 to request the census impression controller 326 to match census impression records to panelist impression records, thereby identifying media identified in the census impression records as accessed by panelists monitored by the AME computer 110. As described above, the example data logger circuitry 316 can store a plurality of panelist impression records, therefore the on-device meter 308 does not have to send each panelist impression record to the census system 324 individually. Instead, the on-device meter 308 can send the data in larger batches and reduce communication overhead.

To match census impression records with panelist impression records, the census system 324 includes the census impression controller 326. The example census impression controller 326 is provided with the network interface circuitry 328 to receive census impression requests from the client device 108 and/or send responses to the client device 108. The example network interface circuitry 328 also receives match queries and panelist impression information from the AME computer 110, and sends comparison analysis results to the AME computer 110. The example network interface circuitry 328 may connect the census system 324 to the network 340. The example network interface circuitry 328 may be a physical device (e.g., a discrete network interface card, part of a system on a chip, etc.). In some examples, the example network interface circuitry 328 may be implemented using software and/or may be virtualized.

The example census impression controller 326 includes the data interface circuitry 330 to log census impression records in a data store or memory based on census impression requests received from client devices 108. The example data interface circuitry 330 also accesses the impression records in the data store or memory in response to process match queries from the AME 102. The example comparator circuitry 332 performs comparison analyses between panelist impression information from the AME computer 110 and logged census impression records to generate comparison analysis results. The comparison analysis results confirm matches between panelist impression records and census impression records. Such confirmed matches are indicative of census impression records corresponding to or attributable to AME panelists. In examples disclosed herein, the census impression controller 326 provides media-identifying information (e.g., a media identifier) in the comparison analysis results. When the AME computer 110 receives the comparison analysis results from the second network interface circuitry 328 of the census impression controller 326, the AME 102 can use the media-identifying information in the comparison analysis results to identify media accessed by panelists monitored by the AME 102.

The example census system 324 and the example AME computer 110 may be implemented by computers and/or servers owned and/or operated by the AME 102. Alternatively, the example census system 324 may be owned and/or operated by an entity different from the AME 102. In some examples, the census system 324 and the AME computer 110 may operate in the cloud on third-party servers, in the cloud as serverless functions, in a virtualized system, or any combination thereof.

A flowchart representative of example hardware logic circuitry, machine readable instructions, hardware implemented state machines, and/or any combination thereof for implementing the client device 108, the AME computer 110, and/or the census system 324 of FIGS. 1-3 is shown in FIGS. 4-8. The machine readable instructions may be one or more executable programs or portion(s) of an executable program for execution by processor circuitry, such as the processor circuitry 912 shown in the example processor platform 900 discussed below in connection with FIG. 9 and/or the example processor circuitry discussed below in connection with FIGS. 10-13. The program may be embodied in software stored on one or more non-transitory computer readable storage media such as a compact disk (CD), a floppy disk, a hard disk drive (HDD), a solid-state drive (SSD), a digital versatile disk (DVD), a Blu-ray disk, a volatile memory (e.g., Random Access Memory (RAM) of any type, etc.), or a non-volatile memory (e.g., electrically erasable programmable read-only memory (EEPROM), FLASH memory, an HDD, an SSD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN)) gateway that may facilitate communication between a server and an endpoint client hardware device). Similarly, the non-transitory computer readable storage media may include one or more mediums located in one or more hardware devices. Further, although the example program is described with reference to the flowcharts illustrated in FIGS. 4-8, many other methods of implementing the example systems of FIGS. 1-3 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU), etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C #, Perl, Python, JavaScript, HyperText Markup Language (HTML), Structured Query Language (SQL), Swift, etc.

As mentioned above, the example operations of FIGS. 4-8 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium and non-transitory computer readable storage medium are expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

Figure 4:
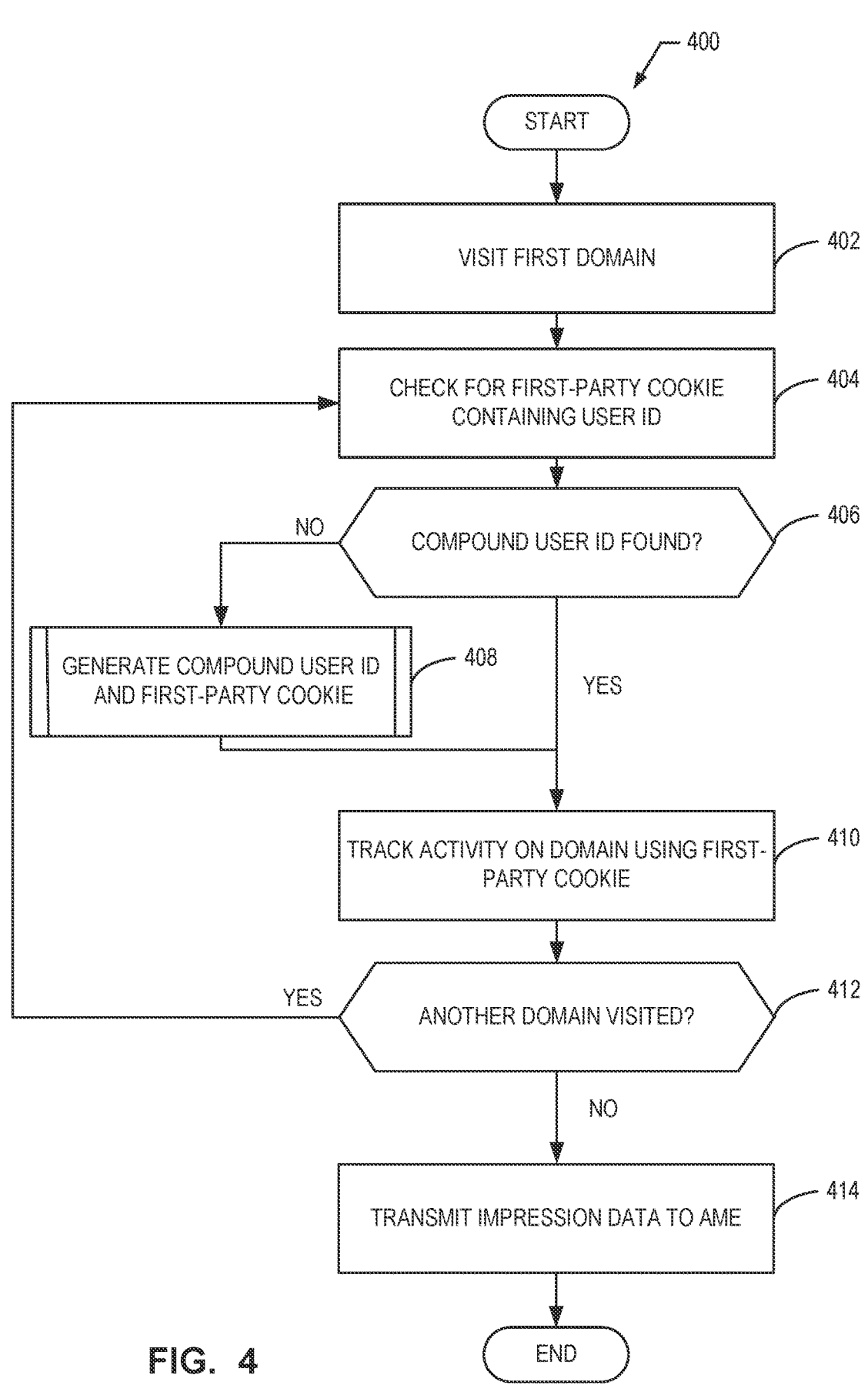
FIG. 4 is a flowchart representative of example machine readable instructions and/or example operations that may be executed by example processor circuitry to implement the DNS cache-based audience monitoring system of FIGS. 1-3.

FIG. 4 is a flowchart representative of example machine readable instructions and/or example operations 400 that may be executed and/or instantiated by processor circuitry to implement the client device 108 of FIGS. 1-3 to perform DNS-based user tracking. The machine readable instructions and/or the operations 400 of FIG. 4 begin at block 402 at which the example browser 202 of FIG. 2 visits a first domain. For example, the browser 202 of FIG. 2 may visit a domain operated by the database proprietor 106 of FIG. 1 that provides monitoring instructions for execution by the example browser 202 of FIG. 2. After the browser 202 of FIG. 2 has downloaded the monitoring instructions, the browser 202 of FIG. 2 checks for a first-party cookie containing a compound user ID at block 404. For example, the browser 202 of FIG. 2 may check a storage location for the presence of a first-party cookie containing a compound user ID that has not exceeded a threshold duration based on a TTL value of an associated DNS resolution request. The example client device 108 of FIG. 2 determines if a compound user ID was found at block 406. If the compound user ID is not found (block 406: NO), then the example client device 108 of FIG. 2 generates a compound user ID and a first-party cookie at block 408 before control continues at block 410. Example instructions that may be used to implement block 408 are described in further detail below in association with FIGS. 5 and 6.

If a compound user ID is found at block 406, control continues at block 410, at which the example client device 108 of FIG. 2 tracks activity on the domain using the first-party cookie. For example, the browser 202 of FIG. 2 may store information related to the visit of the first domain in the first party cookie for later transmission to the AME computer 110 of FIG. 2. At block 412, the example browser 202 of FIG. 2 determines if another domain has been visited. For example, a user may navigate away from the first domain and visit a second domain that is not associated with the database proprietor of the first domain. In such a case, control returns to block 404 at which the browser 202 of FIG. 2 checks for a first-party cookie for the second domain. Otherwise, control advances to block 414 at which the browser 202 of FIG. 2 transmits impression data to the AME computer 110 of FIG. 2. For example, the client device 108 of FIG. 2 may batch impression information and send the batched impression information (e.g., containing tracking information from visits to more than one domain to the AME 102 of FIG. 2. In some examples, the client device 108 of FIG. 2 may transmit data to the AME 102 of FIG. 2 after every visit to a new domain or at any threshold period of time. The instructions 400 end.

Figure 5:
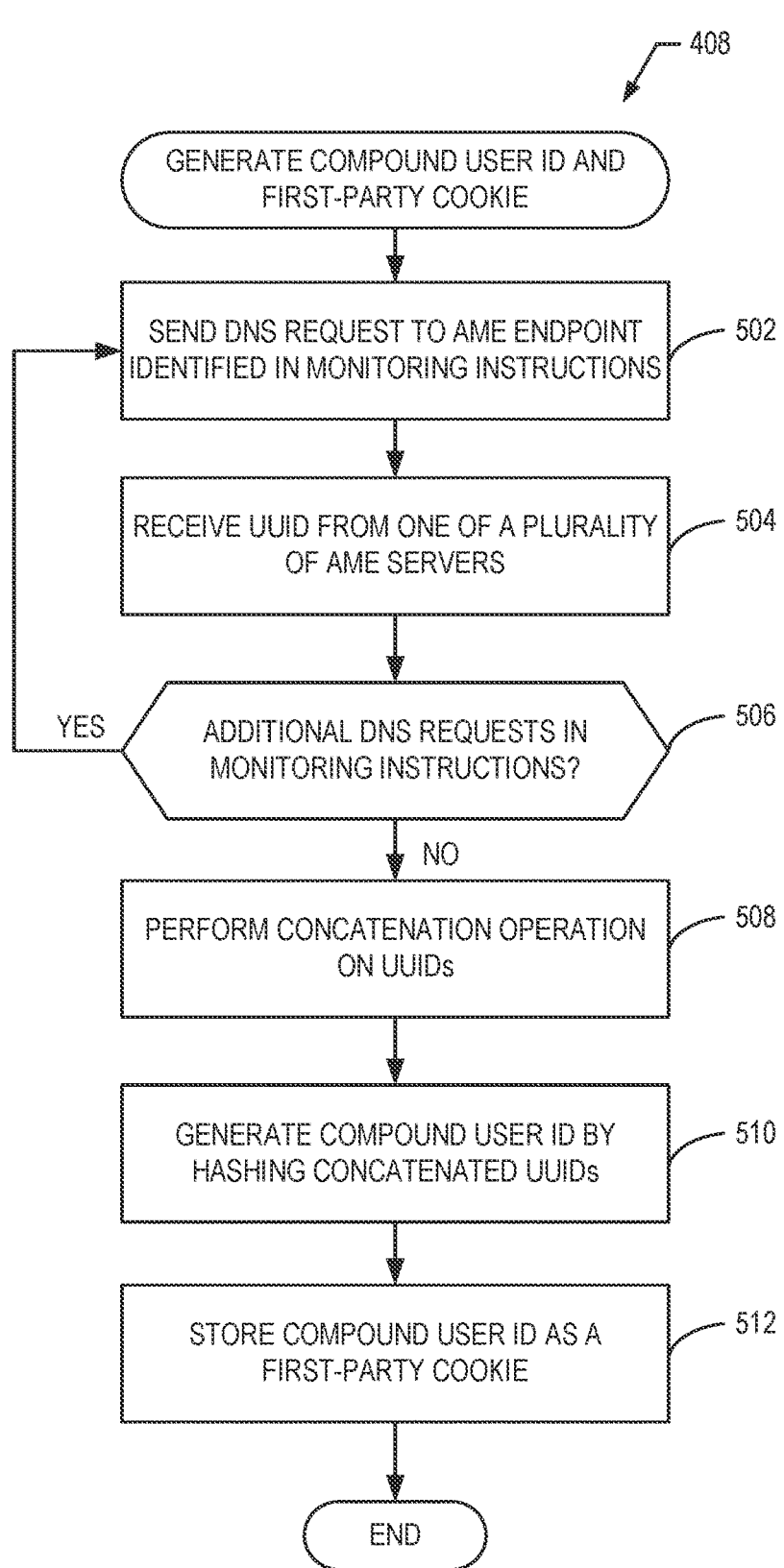
FIG. 5 is a flowchart representative of example machine readable instructions and/or example operations that may be executed by example processor circuitry to generate a user identifier (ID) and a first-party cookie.

FIG. 5 is a flowchart representative of example machine readable instructions and/or example operations 408 that may be executed and/or instantiated by processor circuitry to implement the client device 108 of FIGS. 1-3 to generate a compound user ID and a first-party cookie. The machine readable instructions and/or the operations 406 of FIG. 5 begin at block 502, at which the example client device 108 of FIG. 2 sends a DNS request to an AME endpoint identified in monitoring instructions. For example, the client device 108 may send a DNS resolution request to an authoritative name server (e.g., the DNS server 210 of FIG. 2) associated with the AME 102 of FIG. 2. In response to receiving a DNS resolution, the example client device 108 of FIG. 2 may transmit an impression request to one of a plurality of AME servers (e.g., an AME server corresponding to an IP address from one of the server pool addresses 212, 214, 216). At block 504, the example client device 108 of FIG. 2 receives a UUID from at least one of the plurality of AME servers. For example, the DNS resolution request may be for an AME server host corresponding to "a.imr-.com." In some examples, a plurality of server hosts of the AME 102 may be associated with "a.imr.com," with each of the plurality of servers returning a UUID in an impression response (e.g., server 1.1.1.1 returns "000", server 1.1.1.2 returns "001"). In some examples, the UUID is a number. However, the string of bits returned as a UUID may be interpreted as a letter, a word, etc.

At block 506, the example client device 108 determines if there are additional DNS requests to be made based on the monitoring instructions. For example, monitoring instructions may cause the browser 202 of FIG. 2 to request a DNS resolution for "a.imr.com" and for "b.imr.com" (e.g., two hosts "a" and "b", at the same domain "imr.com" that is operated by the AME 102 of FIG. 2). If so (block 506: YES), control returns to block 502 at which the example client device 108 of FIG. 2 sends a DNS request to a second AME endpoint in the monitoring instructions. Otherwise (block 506: NO), control advances to block 508, at which the example client device 108 performs a concatenation operation. For example, the client device 108 may concatenate two or more UUIDs and generate a single compound user ID. In some examples, the UUIDs are ordered and provided as input to a hash function for concatenation and generation of the compound user ID. At block 512, the example browser 202 of FIG. 2 stores the compound user ID as a first-party cookie. For example, the browser 202 of FIG. 2 may store the compound user ID as a first-party cookie for a TTL value that is based on a TTL value of a DNS request that was performed to generate the compound user ID. The instructions 408 of FIG. 5 end.

Figure 6:
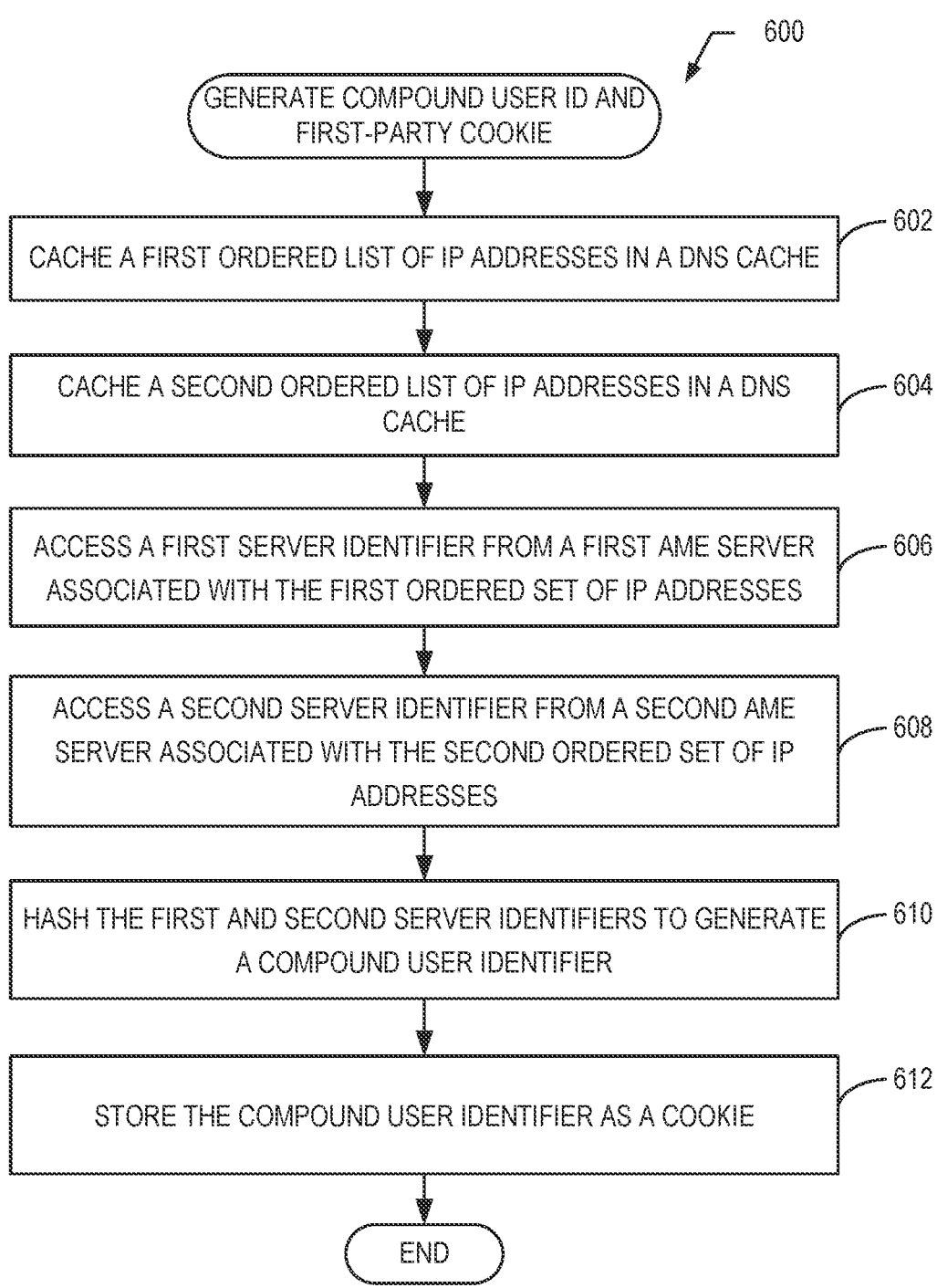
FIG. 6 is another flowchart representative of example machine readable instructions and/or example operations that may be executed by example processor circuitry to generate a user ID and a cookie.

FIG. 6 is a flowchart representative of alternate example machine readable instructions and/or example operations 600 that may be executed and/or instantiated by processor circuitry to implement the client device 108 of FIGS. 1-3 to generate a compound user ID and a first-party cookie. That is, the instructions 600 of FIG. 6 are an alternative implementation of the instructions 408 of FIGS. 4-5 to generate a compound user ID and a cookie. The instructions 600 start at block 602 at which the example browser 202 of FIG. 2 caches a first ordered list of IP addresses in a DNS cache. For example, the browser 202 may execute an application system interface (API) call to an operating system API that manages requests for DNS resolutions. The operating system of the client device 108 of FIG. 2 may then retrieve the ordered list of IP addresses and store the ordered list of IP addresses in the device DNS cache 204 of FIG. 2 before providing the ordered list of IP addresses to the browser 202 of FIG. 2. At block 604, the example client device 108 of FIG. 2 caches a second ordered list of IP addresses in the device DNS cache 204 of FIG. 2. For example, the second ordered list of IP addresses may be associated with a second DNS request made by the browser 202 based on monitoring instructions.

At block 606, the example browser 202 accesses a first server identifier from a first AME server associated with the first ordered set of IP addresses. For example, a plurality of IP addresses may be stored in the device DNS cache 204 of FIG. 2, but the device DNS cache 204 of FIG. 2 may consistently provide the same IP address of the plurality of IP addresses when queried for a first host (e.g., consistently return 1.1.1.1 to the browser 202 of FIG. 2 in response to a request to resolve "a.imr.com").

At block 606, the example browser 202 accesses a first server identifier from a first AME server associated with the first ordered set of IP addresses. For example, the client device 108 may access (e.g., receive in an impression response) a unique identifier (e.g., "1234") from an AME server. For example, the client device 108 of FIG. 3 sends an HTTP request to the server pool 212 of FIG. 3 based on one or more monitoring instructions executed by the browser 304 of FIG. 3 and receives "1234" in a response to the HTTP request. At block 608, the example client device 108 of FIG. 2 accesses a second server identifier from a second AME server associated with the second ordered set of IP addresses. For example, the client device 108 may access (e.g., receive in an impression response) a unique identifier (e.g., "5678") from an AME server. For example, the client device 108 of FIG. 3 sends an HTTP request to the server pool 214 of FIG. 3 based on one or more of monitoring instructions executed by the browser 304 of FIG. 3 and receives "5678" in response).

At block 610, the example browser 202 hashes the first and second server identifiers to generate a user identifier. For example, the browser 202 of FIG. 2 may concatenate or otherwise combine: (a) the first server identifier (e.g., "1234") that was received in a first impression response from the first AME server pool 212 and (b) the second server identifier (e.g., "5678" that was received in the second impression response from the second AME server pool 214).

The example browser 202 may then hash the first and second server identifiers (e.g., hash "12345678" to generate a compound user identifier of "001010"). At block 612, the example browser 202 of FIG. 2 stores the compound user identifier (e.g., "001010") as a cookie. For example, the browser 202 of FIG. 2 may store the user identifier as a first-party cookie, a third-party cookie, etc. The instructions of FIG. 6 end.

Figure 7:
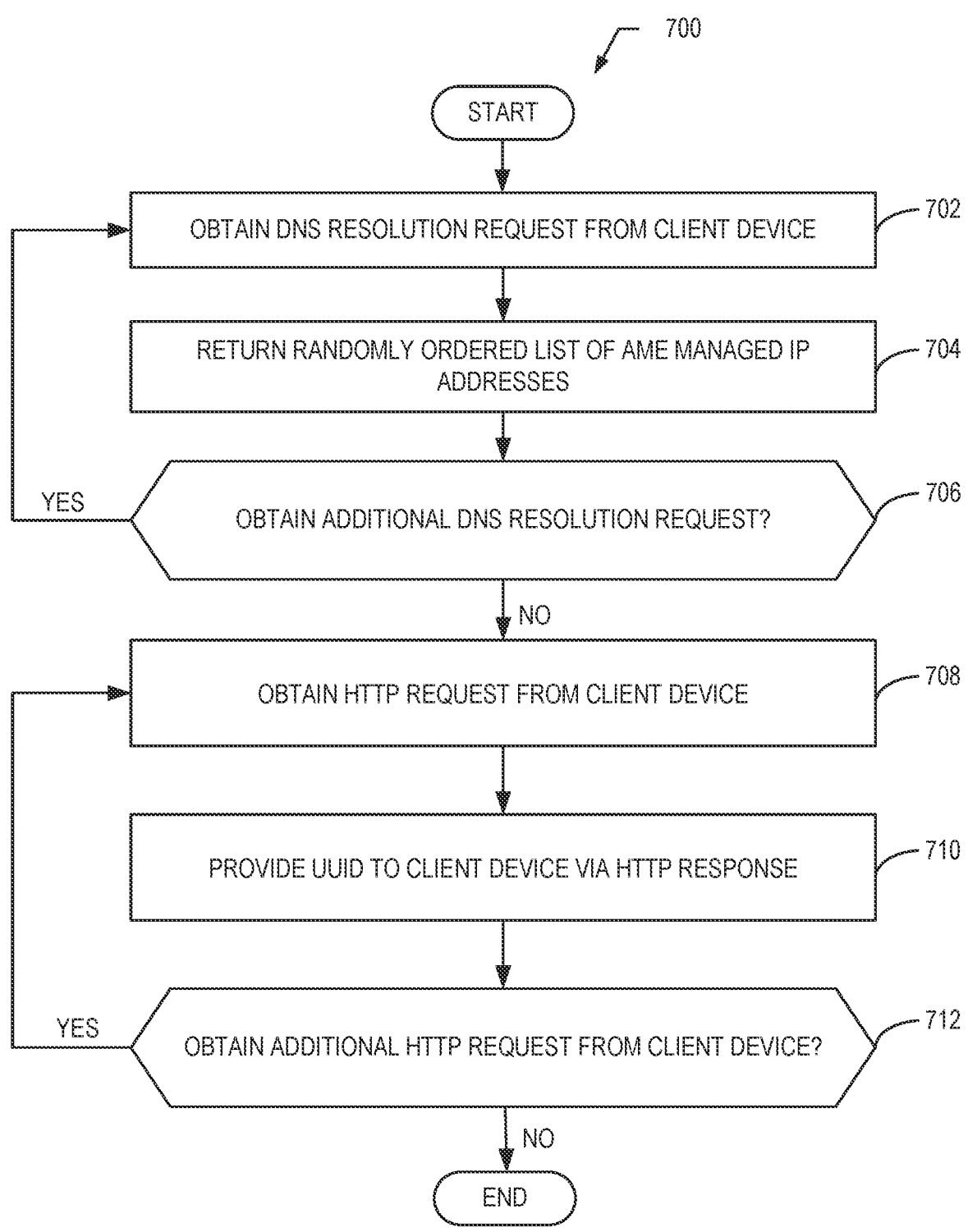
FIG. 7 is a flowchart representative of example machine readable instructions and/or example operations that may be executed by example processor circuitry to provide universally unique identifiers (UUIDs) to a client device.

FIG. 7 is a flowchart representative of example machine readable instructions and/or example operations 700 that may be executed and/or instantiated by processor circuitry to implement the example AME computer 110 of FIGS. 1-3 to perform DNS resolution and to provide UUIDs to a client device. FIG. 7 begins at block 702, at which the example DNS server 210 of FIG. 2 obtains a DNS resolution request from the client device 108 of FIG. 2. For example, the DNS server 210 of FIG. 2 may receive a DNS resolution request for the hostname "a" of "imr.com" (e.g., resolve a.imr.com from a DNS resolution request of the client device 108 of FIG. 2). At block 704, the example DNS server 210 returns a randomly ordered list of AME-managed IP addresses. For example, the DNS server 210 may return (e.g., transmit) a randomly ordered list of IP addresses associated with "a.imr.com" from the server pool addresses 212 of FIG. 2 (e.g., return 1.1.1.3/1.1.1.2/1.1.1.1 to the client device 108 of FIG. 2). At block 706, the example DNS server 210 of FIG. 2 determines if additional DNS resolution requests have been obtained. If so (block 706: YES), control returns to block 702 at which the DNS server 210 (e.g., and/or the DNS management circuitry 352 of FIG. 3) obtains a second DNS resolution request from the client device (e.g., for "b.imr.com"). Otherwise (block 706: NO), control advances to block 708.

At block 708, the example AME server pool 212 obtains an HTTP request (e.g., an impression request) from a client device. For example, the example server pool 212 of the AME 102 of FIG. 3 may receive an impression request from the client device 108 of FIG. 3. In response, the example server pool 212 of FIG. 3 may return a UUID (e.g., "789") to the client device via an HTTP response at block 710. At block 712, the example AME 102 determines if there are additional HTTP (e.g., impression) requests from the client device 108. If so, control returns to block 708 at which a second impression request is obtained by the AME 102. Otherwise, the instructions of FIG. 7 end.

Figure 8:
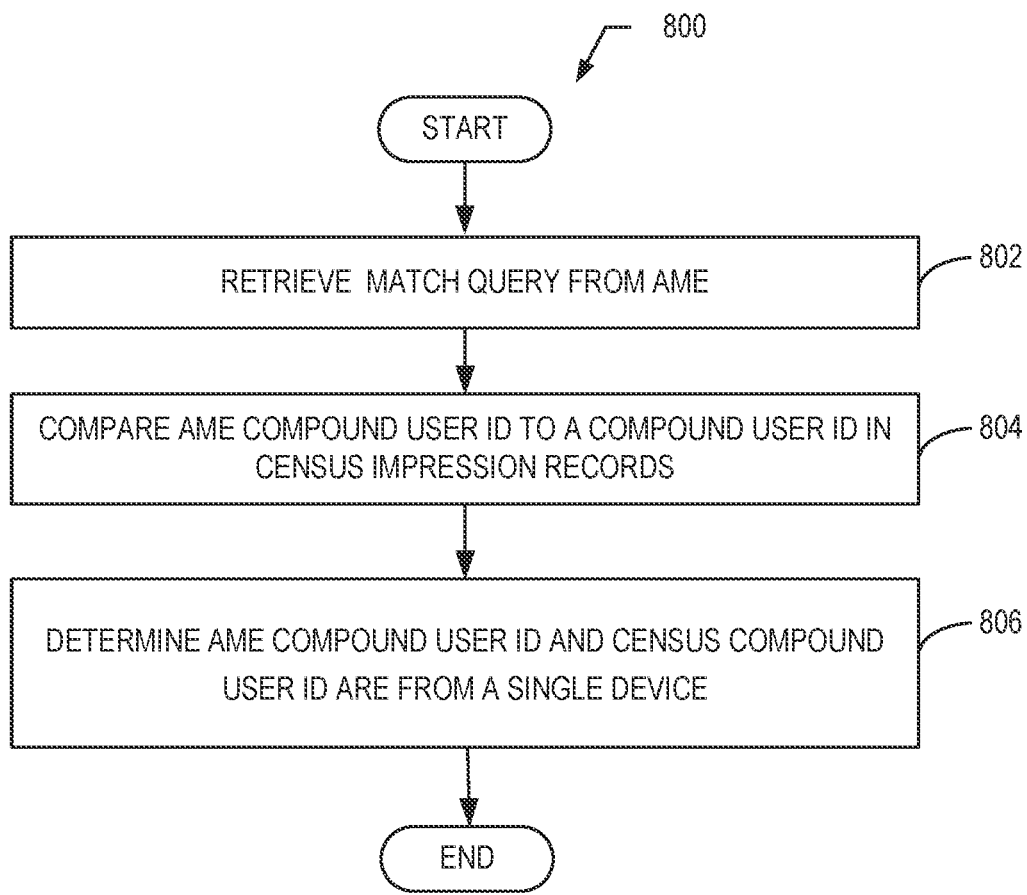
FIG. 8 is a flowchart representative of example machine readable instructions and/or example operations that may be executed by example processor circuitry to match an AME user identifier and a census user identifier.

FIG. 8 is a flowchart representative of example machine readable instructions and/or example operations 800 that may be executed and/or instantiated by processor circuitry to implement the example census system 324 of FIG. 3 to match an AME compound user ID to a census compound user ID. In some examples, a unique identifier (e.g., a UUID) may be generated according to the operations of FIGS. 4-7 and transmitted separately to an AME (e.g., the AME 102 of FIG. 3) and a census system (e.g., the census system 324 of FIG. 3). The operations 800 can identify when two identifiers are the same and therefore generated by the same client device 108. The example operations 800 start at block 802 at which the census system 324 of FIG. 3 retrieves a match query from the AME computer 110 of FIG. 3. For example, the match query may include a unique identifier generated according to the operations of FIGS. 4-7. At block 804, the example census system 324 compares the AME compound user ID to one or more compound user IDs in the census impression records. For example, the census system 324 may compare the AME compound user ID to a database of compound user IDs stored by the census system 324. Finally, at block 806, if the census system 324 determines the AME unique identifier (e.g., a UUID) and the census unique identifier are a match (e.g., corresponding compound user IDs) the census system 324 can transmit an indication of the match to the AME computer 110 of FIG. 3. The instructions of FIG. 8 end.

Figure 9:
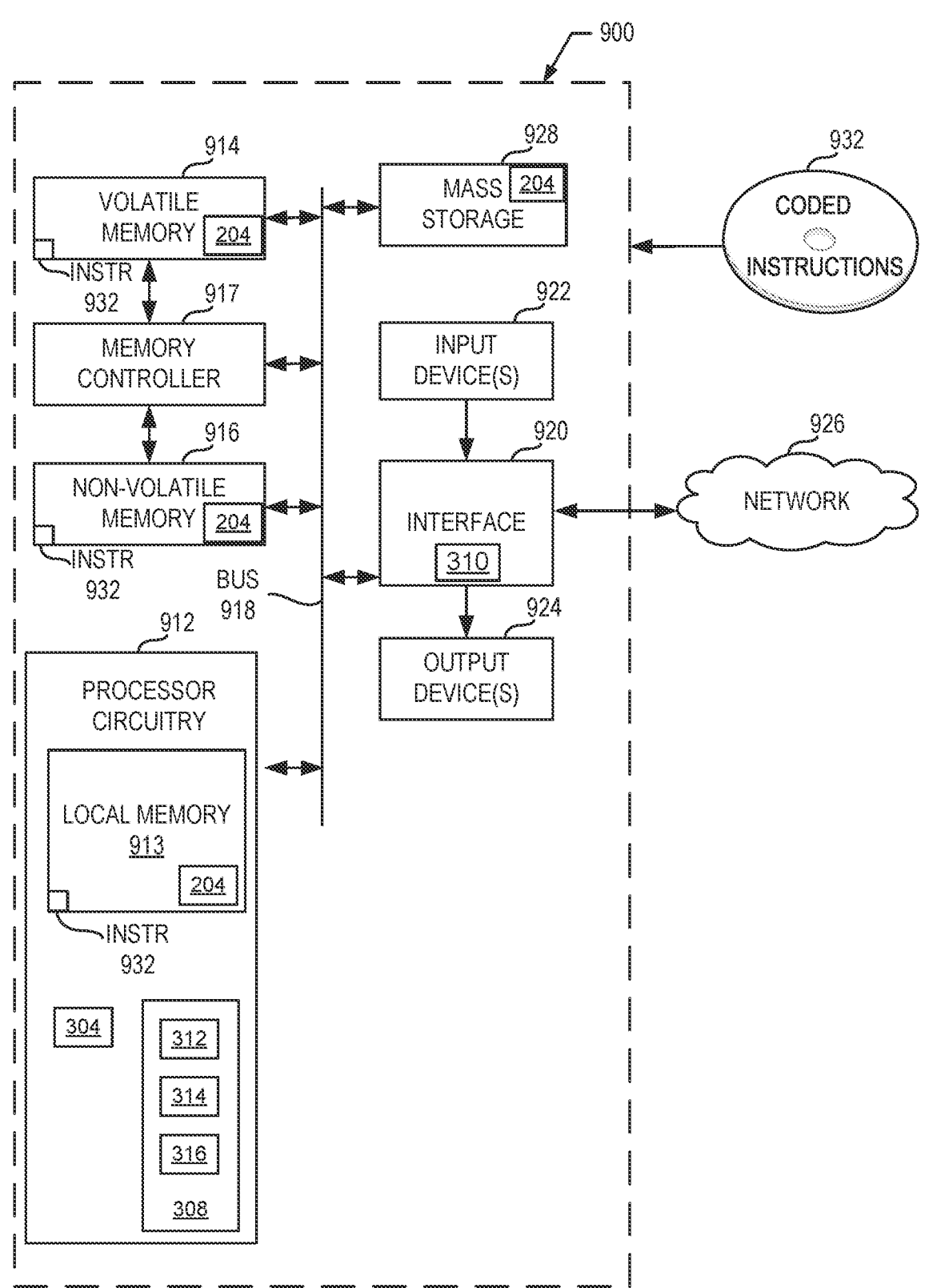
FIG. 9 is a block diagram of an example processing platform including processor circuitry structured to execute the example machine readable instructions and/or the example operations of FIGS. 4-6 to implement the client device of FIGS. 1-3.

FIG. 9 is a block diagram of an example processor platform 900 structured to execute and/or instantiate the machine readable instructions and/or the operations of FIGS. 4-6 to implement the client device 108 of FIGS. 1-3. The processor platform 900 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, or any other type of computing device.

The processor platform 900 of the illustrated example includes processor circuitry 912. The processor circuitry 912 of the illustrated example is hardware. For example, the processor circuitry 912 can be implemented by one or more integrated circuits, logic circuits, FPGAs, microprocessors, CPUs, GPUs, DSPs, and/or microcontrollers from any desired family or manufacturer. The processor circuitry 912 may be implemented by one or more semiconductor based (e.g., silicon based) devices. In this example, the processor circuitry 912 implements the browser 304, the on-device meter 308, the packet detector circuitry 312, the data collector circuitry 314, and the data logger circuitry 316 of FIG. 3.

The processor circuitry 912 of the illustrated example includes a local memory 913 (e.g., a cache, registers, etc.). The processor circuitry 912 of the illustrated example is in communication with a main memory including a volatile memory 914 and a non-volatile memory 916 by a bus 918. The volatile memory 914 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 916 may be implemented by flash memory and/or any other desired type of memory device. Access to the main memory 914, 916 of the illustrated example is controlled by a memory controller 917.

The processor platform 900 of the illustrated example also includes interface circuitry 920. The interface circuitry 920 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 922 are connected to the interface circuitry 920. The input device(s) 922 permit(s) a user to enter data and/or commands into the processor circuitry 912. The input device(s) 922 can be implemented by, for example, an audio sensor, a microphone, a camera (still or video), a keyboard, a button, a mouse, a touchscreen, a track-pad, a trackball, an isopoint device, and/or a voice recognition system.

One or more output devices 924 are also connected to the interface circuitry 920 of the illustrated example. The output device(s) 924 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 920 of the illustrated example, thus, typically includes a graphics driver card, a graphics driver chip, and/or graphics processor circuitry such as a GPU.

The interface circuitry 920 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 926. The communication can be by, for example, an Ethernet connection, a digital subscriber line (DSL) connection, a telephone line connection, a coaxial cable system, a satellite system, a line-of-site wireless system, a cellular telephone system, an optical connection, etc. In this example, the interface circuitry 920 implements the network interface circuitry 310 of FIG. 3.

The processor platform 900 of the illustrated example also includes one or more mass storage devices 928 to store software and/or data. Examples of such mass storage devices 928 include magnetic storage devices, optical storage devices, floppy disk drives, HDDs, CDs, Blu-ray disk drives, redundant array of independent disks (RAID) systems, solid state storage devices such as flash memory devices and/or SSDs, and DVD drives.

The machine executable instructions 932, which may be implemented by the machine readable instructions of FIGS. 4-6, may be stored in the mass storage device 928, in the volatile memory 914, in the non-volatile memory 916, and/or on a removable non-transitory computer readable storage medium such as a CD or DVD. In this example the device DNS cache 204 of FIGS. 2 and 3 may be implemented in the local memory 913, the volatile memory 914, the non-volatile memory 916, and/or the mass storage 928.

Figure 10:
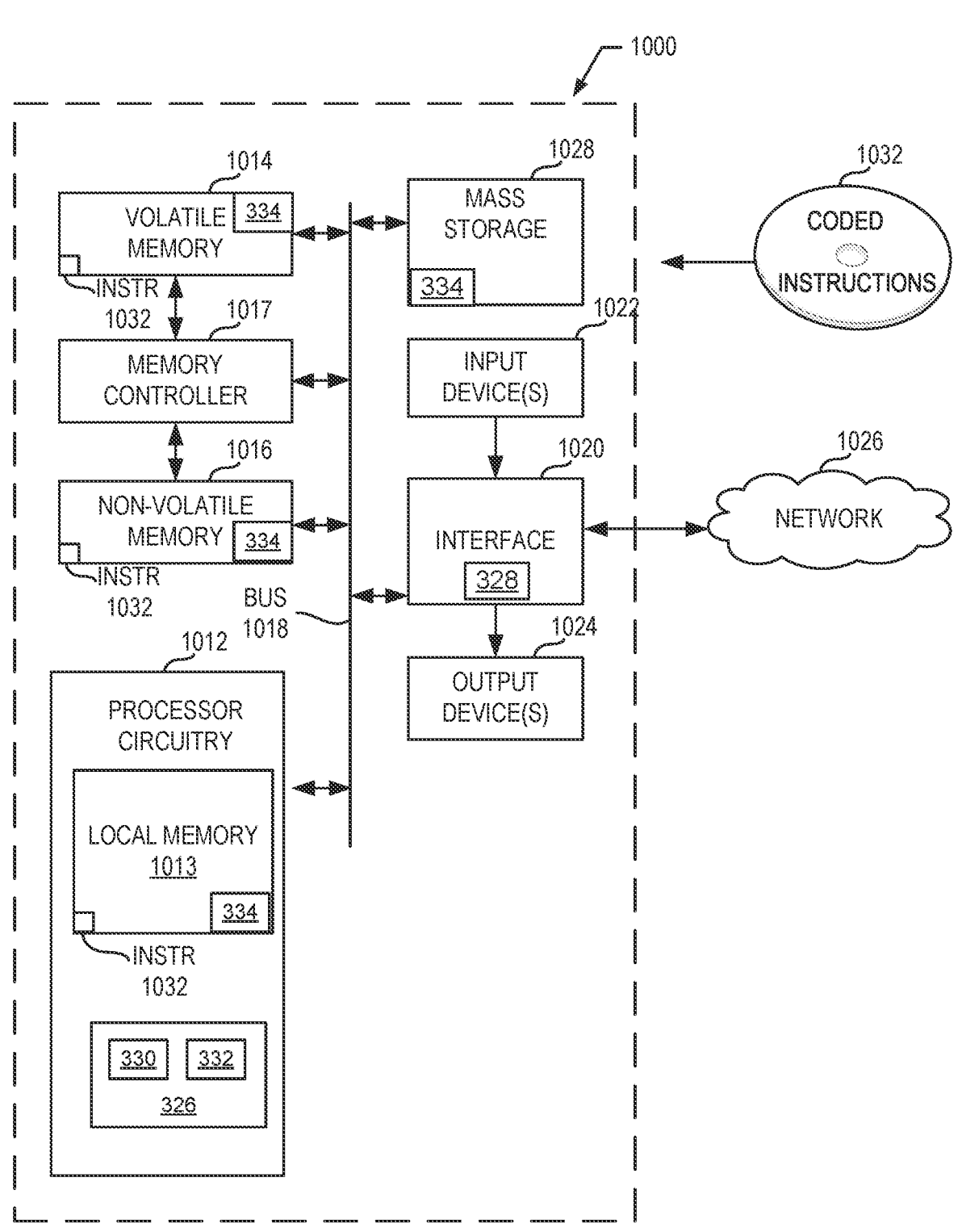
FIG. 10 is a block diagram of an example processing platform including processor circuitry structured to execute the example machine readable instructions and/or the example operations of FIG. 8 to implement the census system of FIG. 3.

FIG. 10 is a block diagram of an example processor platform 1000 structured to execute and/or instantiate the machine readable instructions and/or the operations of FIG. 8 to implement the census system 324 of FIG. 3. The processor platform 1000 can be, for example, a server, a personal computer, a workstation, a self-learning machine (e.g., a neural network, or any other type of computing device.

The processor platform 1000 of the illustrated example includes processor circuitry 1012. The processor circuitry 1012 of the illustrated example is hardware. For example, the processor circuitry 1012 can be implemented by one or more integrated circuits, logic circuits, FPGAs, microprocessors, CPUs, GPUs, DSPs, and/or microcontrollers from any desired family or manufacturer. The processor circuitry 1012 may be implemented by one or more semiconductor based (e.g., silicon based) devices. In this example, the processor circuitry 1012 implements the data interface circuitry 330, the comparator circuitry 332, and the census impression controller 326 of FIG. 3.

The processor circuitry 1012 of the illustrated example includes a local memory 1013 (e.g., a cache, registers, etc.). The processor circuitry 1012 of the illustrated example is in communication with a main memory including a volatile memory 1014 and a non-volatile memory 1016 by a bus 1018. The volatile memory 1014 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 1016 may be implemented by flash memory and/or any other desired type of memory device. Access to the main memory 1014, 1016 of the illustrated example is controlled by a memory controller 1017.

The processor platform 1000 of the illustrated example also includes interface circuitry 1020. The interface circuitry 1020 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 622 are connected to the interface circuitry 1020. The input device(s) 1022 permit(s) a user to enter data and/or commands into the processor circuitry 1012. The input device(s) 1022 can be implemented by, for example, an audio sensor, a microphone, a camera (still or video), a keyboard, a button, a mouse, a touchscreen, a track-pad, a trackball, an isopoint device, and/or a voice recognition system.

One or more output devices 1024 are also connected to the interface circuitry 1020 of the illustrated example. The output device(s) 1024 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 1020 of the illustrated example, thus, typically includes a graphics driver card, a graphics driver chip, and/or graphics processor circuitry such as a GPU.

The interface circuitry 1020 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 1026. The communication can be by, for example, an Ethernet connection, a digital subscriber line (DSL) connection, a telephone line connection, a coaxial cable system, a satellite system, a line-of-site wireless system, a cellular telephone system, an optical connection, etc. In this example, the interface circuitry 1020 implements the network interface circuitry 328 of FIG. 3.

The processor platform 1000 of the illustrated example also includes one or more mass storage devices 1028 to store software and/or data. Examples of such mass storage devices 1028 include magnetic storage devices, optical storage devices, floppy disk drives, HDDs, CDs, Blu-ray disk drives, redundant array of independent disks (RAID) systems, solid state storage devices such as flash memory devices and/or SSDs, and DVD drives. In this example, the data storage 334 of FIG. 3 may be implemented in the local memory 1013 the volatile memory 1014, the non-volatile memory 1016 and/or the mass storage 1028.

The machine executable instructions 1032, which may be implemented by the machine readable instructions of FIG. 8, may be stored in the mass storage device 1028, in the volatile memory 1014, in the non-volatile memory 1016, and/or on a removable non-transitory computer readable storage medium such as a CD or DVD.

Figure 11:
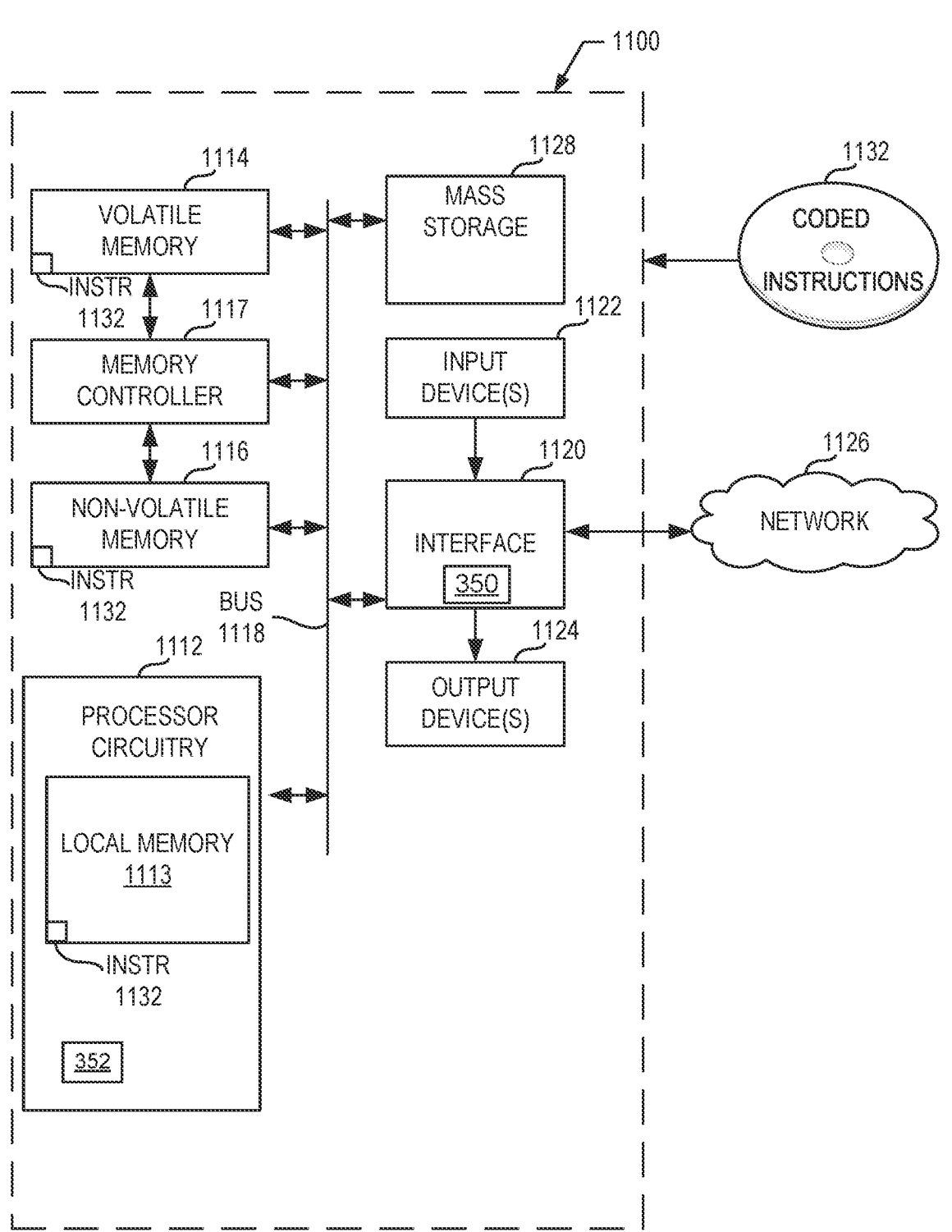
FIG. 11 is a block diagram of an example processing platform including processor circuitry structured to execute the example machine readable instructions and/or the example operations of FIG. 7 to implement the AME computer of FIG. 3.

FIG. 11 is a block diagram of an example processor platform 800 structured to execute and/or instantiate the machine readable instructions and/or the operations of FIG. 7 to implement the AME computer 110 of FIGS. 1-3. The processor platform 1100 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, or any other type of computing device.

The processor platform 1100 of the illustrated example includes processor circuitry 1112. The processor circuitry 1112 of the illustrated example is hardware. For example, the processor circuitry 1112 can be implemented by one or more integrated circuits, logic circuits, FPGAs, microprocessors, CPUs, GPUs, DSPs, and/or microcontrollers from any desired family or manufacturer. The processor circuitry 1112 may be implemented by one or more semiconductor based (e.g., silicon based) devices. In this example, the processor circuitry 1112 implements the DNS management circuitry 352 of FIG. 3.

The processor circuitry 1112 of the illustrated example includes a local memory 1113 (e.g., a cache, registers, etc.). The processor circuitry 1112 of the illustrated example is in communication with a main memory including a volatile memory 1114 and a non-volatile memory 1116 by a bus 1118. The volatile memory 1114 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 1116 may be implemented by flash memory and/or any other desired type of memory device. Access to the main memory 1114, 1116 of the illustrated example is controlled by a memory controller 1117.

The processor platform 1100 of the illustrated example also includes interface circuitry 1120. The interface circuitry 1120 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 622 are connected to the interface circuitry 1120. The input device(s) 1122 permit(s) a user to enter data and/or commands into the processor circuitry 1112. The input device(s) 1122 can be implemented by, for example, an audio sensor, a microphone, a camera (still or video), a keyboard, a button, a mouse, a touchscreen, a track-pad, a trackball, an isopoint device, and/or a voice recognition system.

One or more output devices 1124 are also connected to the interface circuitry 1120 of the illustrated example. The output device(s) 1124 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 1120 of the illustrated example, thus, typically includes a graphics driver card, a graphics driver chip, and/or graphics processor circuitry such as a GPU.

The interface circuitry 1120 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 1126. The communication can be by, for example, an Ethernet connection, a digital subscriber line (DSL) connection, a telephone line connection, a coaxial cable system, a satellite system, a line-of-site wireless system, a cellular telephone system, an optical connection, etc. In this example, the interface circuitry 1120 implements the network interface circuitry 350 of FIG. 3.

The processor platform 1100 of the illustrated example also includes one or more mass storage devices 1128 to store software and/or data. Examples of such mass storage devices 1128 include magnetic storage devices, optical storage devices, floppy disk drives, HDDs, CDs, Blu-ray disk drives, redundant array of independent disks (RAID) systems, solid state storage devices such as flash memory devices and/or SSDs, and DVD drives.

The machine executable instructions 1132, which may be implemented by the machine readable instructions of FIG. 7, may be stored in the mass storage device 1128, in the volatile memory 1114, in the non-volatile memory 1116, and/or on a removable non-transitory computer readable storage medium such as a CD or DVD.

Figure 12:
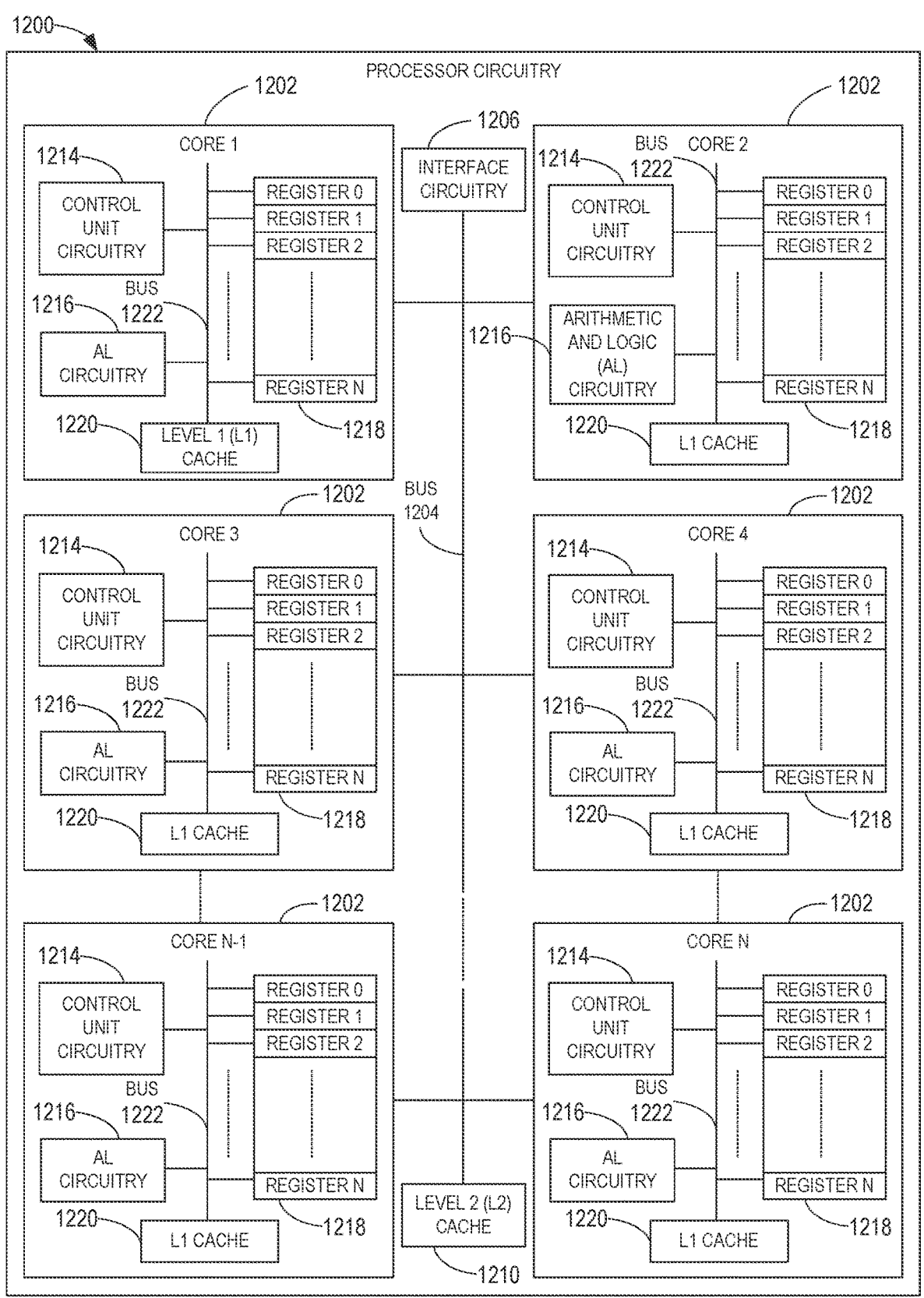
FIG. 12 is a block diagram of an example implementation of the processor circuitry of FIGS. 9-11.

FIG. 12 is a block diagram of an example implementation of the processor circuitry 912, 1012, 1112 of FIGS. 9-11. In this example, the processor circuitry 912, 1012, 1112 of FIGS. 9-11 implemented by a general purpose microprocessor 1200. The general purpose microprocessor circuitry 1200 executes some or all of the machine readable instructions of the flowchart of FIGS. 4-8 to effectively instantiate the system 200 as logic circuits to perform the operations corresponding to those machine readable instructions. In some such examples, the circuitry of FIG. 2 is instantiated by the hardware circuits of the microprocessor 1200 in combination with the instructions. For example, the microprocessor 1200 may implement multi-core hardware circuitry such as a CPU, a DSP, a GPU, an XPU, etc. Although it may include any number of example cores 1202 (e.g., 1 core), the microprocessor 1200 of this example is a multi-core semiconductor device including N cores. The cores 1202 of the microprocessor 1200 may operate independently or may cooperate to execute machine readable instructions. For example, machine code corresponding to a firmware program, an embedded software program, or a software program may be executed by one of the cores 1202 or may be executed by multiple ones of the cores 1202 at the same or different times. In some examples, the machine code corresponding to the firmware program, the embedded software program, or the software program is split into threads and executed in parallel by two or more of the cores 1202. The software program may correspond to a portion or all of the machine readable instructions and/or operations represented by the flowchart of FIGS. 4-8.

The cores 1202 may communicate by a first example bus 1204. In some examples, the first bus 1204 may implement a communication bus to effectuate communication associated with one(s) of the cores 1202. For example, the first bus 1204 may implement at least one of an Inter-Integrated Circuit (I2C) bus, a Serial Peripheral Interface (SPI) bus, a PCI bus, or a PCIe bus. Additionally or alternatively, the first bus 1204 may implement any other type of computing or electrical bus. The cores 1202 may obtain data, instructions, and/or signals from one or more external devices by example interface circuitry 1206. The cores 1202 may output data, instructions, and/or signals to the one or more external devices by the interface circuitry 1206. Although the cores 1202 of this example include example local memory 1220 (e.g., Level 1 (L1) cache that may be split into an L1 data cache and an L1 instruction cache), the microprocessor 1200 also includes example shared memory 1210 that may be shared by the cores (e.g., Level 2 (L2_ cache)) for high-speed access to data and/or instructions. Data and/or instructions may be transferred (e.g., shared) by writing to and/or reading from the shared memory 1210. The local memory 1220 of each of the cores 1202 and the shared memory 1210 may be part of a hierarchy of storage devices including multiple levels of cache memory and the main memory (e.g., the main memory of FIGS. 6-8). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 1202 may be referred to as a CPU, DSP, GPU, etc., or any other type of hardware circuitry. Each core 1202 includes control unit circuitry 1214, arithmetic and logic (AL) circuitry (sometimes referred to as an ALU) 1216, a plurality of registers 1218, the L1 cache 1220, and a second example bus 1222. Other structures may be present. For example, each core 1202 may include vector unit circuitry, single instruction multiple data (SIMD) unit circuitry, load/store unit (LSU) circuitry, branch/jump unit circuitry, floating-point unit (FPU) circuitry, etc. The control unit circuitry 1214 includes semiconductor-based circuits structured to control (e.g., coordinate) data movement within the corresponding core 1202. The AL circuitry 1216 includes semiconductor-based circuits structured to perform one or more mathematic and/or logic operations on the data within the corresponding core 1202. The AL circuitry 1216 of some examples performs integer based operations. In other examples, the AL circuitry 1216 also performs floating point operations. In yet other examples, the AL circuitry 1216 may include first AL circuitry that performs integer based operations and second AL circuitry that performs floating point operations. In some examples, the AL circuitry 1216 may be referred to as an Arithmetic Logic Unit (ALU). The registers 1218 are semiconductor-based structures to store data and/or instructions such as results of one or more of the operations performed by the AL circuitry 1216 of the corresponding core 1202. For example, the registers 1218 may include vector register(s), SIMD register(s), general purpose register(s), flag register(s), segment register(s), machine specific register(s), instruction pointer register(s), control register(s), debug register(s), memory management register (s), machine check register(s), etc. The registers 1218 may be arranged in a bank as shown in FIGS. 9-11. Alternatively, the registers 1218 may be organized in any other arrangement, format, or structure including distributed throughout the core 1202 to shorten access time. The second bus 1222 may implement at least one of an I2C bus, a SPI bus, a PCI bus, or a PCIe bus Each core 1202 and/or, more generally, the microprocessor 1200 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 1200 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 13:
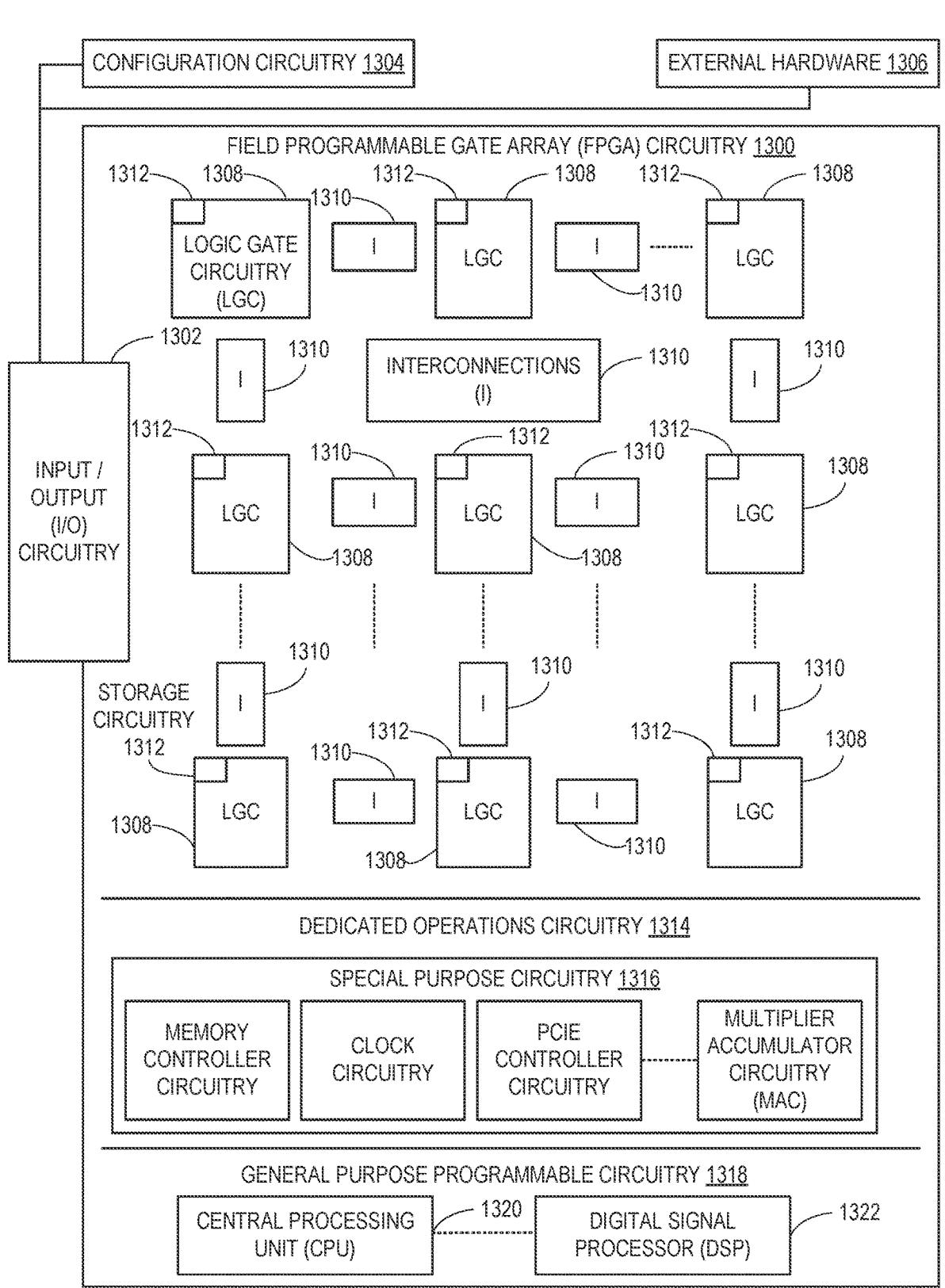
FIG. 13 is a block diagram of another example implementation of the processor circuitry of FIGS. 9-11.

FIG. 13 is a block diagram of another example implementation of the processor circuitry 912, 1012, 1112 of FIGS. 9-11. In this example, processor circuitry 912, 1012, 1112 of FIGS. 9-11 is implemented by FPGA circuitry 1300. The FPGA circuitry 1300 can be used, for example, to perform operations that could otherwise be performed by the example processor circuitry 912, 1012, 1112 of FIGS. 9-11 executing corresponding machine readable instructions. However, once configured, the FPGA circuitry 1300 instantiates the machine readable instructions in hardware and, thus, can often execute the operations faster than they could be performed by a general purpose microprocessor executing the corresponding software.

More specifically, in contrast to the microprocessors 900, 1000, 1100 of FIGS. 9-11 described above (which are a general purpose devices that may be programmed to execute some or all of the machine readable instructions represented by the flowcharts of FIGS. 4-8 but whose interconnections and logic circuitry are fixed once fabricated), the FPGA circuitry 1300 of the example of FIG. 13 includes interconnections and logic circuitry that may be configured and/or interconnected in different ways after fabrication to instantiate, for example, some or all of the machine readable instructions represented by the flowcharts of FIGS. 4-8. In particular, the FPGA 1300 may be thought of as an array of logic gates, interconnections, and switches. The switches can be programmed to change how the logic gates are interconnected by the interconnections, effectively forming one or more dedicated logic circuits (unless and until the FPGA circuitry 1300 is reprogrammed). The configured logic circuits enable the logic gates to cooperate in different ways to perform different operations on data received by input circuitry. Those operations may correspond to some or all of the software represented by the flowchart of FIGS. 4-5. As such, the FPGA circuitry 1300 may be structured to effectively instantiate some or all of the machine readable instructions of the flowcharts of FIGS. 4-8 as dedicated logic circuits to perform the operations corresponding to those software instructions in a dedicated manner analogous to an ASIC. Therefore, the FPGA circuitry 1300 may perform the operations corresponding to the some or all of the machine readable instructions of FIGS. 4-8 faster than the general purpose microprocessor can execute the same.

In the example of FIG. 13, the FPGA circuitry 1300 is 0 structured to be programmed (and/or reprogrammed one or more times) by an end user by a hardware description language (HDL) such as Verilog. The FPGA circuitry 1300 of FIG. 13, includes example input/output (I/O) circuitry 1302 to obtain and/or output data to/from example configuration circuitry 1304 and/or external hardware (e.g., external hardware circuitry) 1306. For example, the configuration circuitry 1304 may implement interface circuitry that may obtain machine readable instructions to configure the FPGA circuitry 1300, or portion(s) thereof. In some such examples, the configuration circuitry 1304 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 1306 may implement the microprocessor 1200 of FIG. 12. The FPGA circuitry 1300 also includes an array of example logic gate circuitry 1308, a plurality of example configurable interconnections 1310, and example storage circuitry 1312. The logic gate circuitry 1308 and interconnections 1310 are configurable to instantiate one or more operations that may correspond to at least some of the machine readable instructions of FIGS. 4-8 and/or other desired operations. The logic gate circuitry 1308 shown in FIG. 13 is fabricated in groups or blocks.

Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 1308 to enable configuration of the electrical structures and/or the logic gates to form circuits to perform desired operations. The logic gate circuitry 1308 may include other electrical structures such as look-up tables (LUTs), registers (e.g., flip-flops or latches), multiplexers, etc.

The interconnections 1310 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 1308 to program desired logic circuits.

The storage circuitry 1312 of the illustrated example is structured to store result(s) of the one or more of the operations performed by corresponding logic gates. The storage circuitry 1312 may be implemented by registers or the like. In the illustrated example, the storage circuitry 1312 is distributed amongst the logic gate circuitry 1308 to facilitate access and increase execution speed.

The example FPGA circuitry 1300 of FIG. 13 also includes example Dedicated Operations Circuitry 1314. In this example, the Dedicated Operations Circuitry 1314 includes special purpose circuitry 1316 that may be invoked to implement commonly used functions to avoid the need to program those functions in the field. Examples of such special purpose circuitry 1316 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 1300 may also include example general purpose programmable circuitry 1318 such as an example CPU 1320 and/or an example DSP 1322. Other general purpose programmable circuitry 1318 may additionally or alternatively be present such as a GPU, an XPU, etc., that can be programmed to perform other operations.

Although FIGS. 12 and 13 illustrate two example implementations of the processor circuitry 912, 1012, 1112 of FIGS. 9-11, many other approaches are contemplated. For example, as mentioned above, modern FPGA circuitry may include an on-board CPU, such as one or more of the example CPU 1220 of FIG. 12. Therefore, the processor circuitry 912, 1012, 1112 of FIGS. 9-11 may additionally be implemented by combining the example microprocessor 1200 of FIG. 12 and the example FPGA circuitry 1300 of FIG. 13. In some such hybrid examples, a first portion of the machine readable instructions represented by the flowchart of FIGS. 4-8 may be executed by one or more of the cores 1202 of FIG. 12, a second portion of the machine readable instructions represented by the flowchart of FIGS. 4-8 may be executed by the FPGA circuitry 1300 of FIG. 13, and/or a third portion of the machine readable instructions represented by the flowcharts of FIGS. 4-8 may be executed by an ASIC. It should be understood that some or all of the circuitry of FIGS. 1-3 may, thus, be instantiated at the same or different times. Some or all of the circuitry may be instantiated, for example, in one or more threads executing concurrently and/or in series. Moreover, in some examples, some or all of the circuitry of FIGS. 1-3 may be implemented within one or more virtual machines and/or containers executing on the microprocessor.

In some examples, the processor circuitry 912, 1012, 1112 of FIGS. 9-11 may be in one or more packages. For example, the processor circuitry 1200 of FIG. 9 and/or the FPGA circuitry 1300 of FIG. 13 may be in one or more packages. In some examples, an XPU may be implemented by the processor circuitry 912, 1012, 1112 of FIGS. 9-11, which may be in one or more packages. For example, the XPU may include a CPU in one package, a DSP in another package, a GPU in yet another package, and an FPGA in still yet another package.

Figure 14:
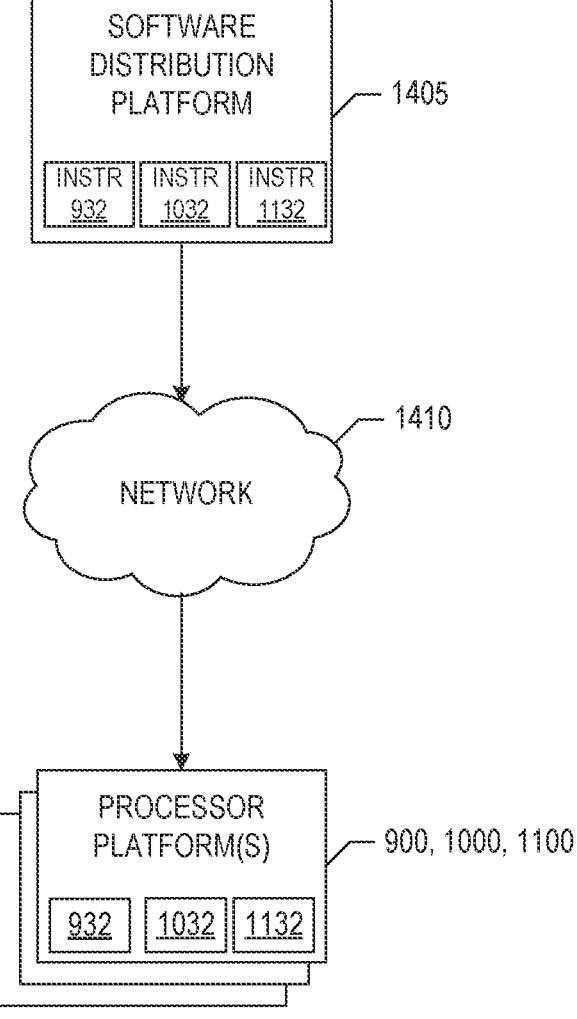
FIG. 14 is a block diagram of an example software distribution platform (e.g., one or more servers) to distribute software (e.g., software corresponding to the example machine readable instructions of FIGS. 4-8 to client devices associated with end users and/or consumers (e.g., for license, sale, and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

A block diagram illustrating an example software distribution platform 1405 to distribute software such as the example machine readable instructions 932, 1032, 1132 of FIGS. 9-11 to hardware devices owned and/or operated by third parties is illustrated in FIG. 14. The example software distribution platform 1405 may be implemented by any computer server, data facility, cloud service, etc., capable of storing and transmitting software to other computing devices. The third parties may be customers of the entity owning and/or operating the software distribution platform 1405. For example, the entity that owns and/or operates the software distribution platform 1405 may be a developer, a seller, and/or a licensor of software such as the example machine readable instructions 932, 1032, 1132 of FIGS. 9-11. The third parties may be consumers, users, retailers, OEMs, etc., who purchase and/or license the software for use and/or re-sale and/or sub-licensing. In the illustrated example, the software distribution platform 1405 includes one or more servers and one or more storage devices. The storage devices store the machine readable instructions 932, 1032, 1132 of FIGS. 9-11, which may correspond to the example machine readable instructions FIGS. 4-8, as described above. The one or more servers of the example software distribution platform 1405 are in communication with a network 1410, which may correspond to any one or more of the Internet and/or any of the example networks described above. In some examples, the one or more servers are responsive to requests to transmit the software to a requesting party as part of a commercial transaction. Payment for the delivery, sale, and/or license of the software may be handled by the one or more servers of the software distribution platform and/or by a third party payment entity. The servers enable purchasers and/or licensors to download the machine readable instructions 632, 732, 832 of FIGS. 6-8 from the software distribution platform 1405. For example, the software, which may correspond to the example machine readable instructions 932, 1032, 1132 of FIGS. 9-11 may be downloaded to the example processor platform 900, 1000, 1100, which is to execute the machine readable instructions 932, 1032, 1132 of FIGS. 9-11 to implement the system 200. In some example, one or more servers of the software distribution platform 1405 periodically offer, transmit, and/or force updates to the software (e.g., the example machine readable instructions 632, 732, 832 of FIGS. 6-8) to ensure improvements, patches, updates, etc., are distributed and applied to the software at the end user devices.

From the foregoing, it will be appreciated that example systems, methods, apparatus, and articles of manufacture have been disclosed that perform DNS cache-based user tracking. Disclosed systems, methods, apparatus, and articles of manufacture improve the efficiency of using a computing device by allowing for efficient cross-site tracking without excessive DNS resolutions. Disclosed systems, methods, apparatus, and articles of manufacture are accordingly directed to one or more improvement(s) in the operation of a machine such as a computer or other electronic and/or mechanical devices.

Example methods, apparatus, systems, and articles of manufacture to use domain name system cache to monitor audiences of media are disclosed herein. Further examples and combinations thereof include the following:

Example 1 includes a system comprising at least one memory, programmable circuitry, and instructions to cause the programmable circuitry to cache a first ordered list of internet protocol (IP) addresses in a domain name system (DNS) cache, cache a second ordered list of IP addresses in the DNS cache, access a first server identifier from a first server associated with the first ordered set of IP addresses, access a second server identifier from a second server associated with the second ordered list of IP addresses, hash the first and second server identifiers to generate a user identifier, and store the user identifier as a cookie.

Example 2 includes the system of example 1, wherein the programmable circuitry is to retrieve the first ordered list of IP addresses based on a first DNS resolution of a first domain name operated by the AME.

Example 3 includes the system of any of the previous examples, wherein the programmable circuitry is to retrieve the second ordered list of IP addresses based on a second DNS resolution of a second domain name operated by the AME.

Example 4 includes the system of any of the previous examples, wherein the first ordered list of IP addresses is a randomly ordered list of AME IP addresses associated with the first domain name.

Example 5 includes the system of any of the previous examples, wherein the cookie is assigned a first time-to-live value based on a second time-to-live value of the first DNS resolution, the first time-to-live value to identify a duration the cookie is valid.

Example 6 includes the system of any of the previous examples, wherein the programmable circuitry is to concatenate the first server identifier and the second server identifier to generate an alphanumeric string for the hash.

Example 7 includes the system of any of the previous examples, wherein the programmable circuitry is to access the first server identifier and the second server identifier as universally unique identifiers obtained from an HTTP response.

Example 8 includes the system of any of the previous examples, wherein the programmable circuitry is to associate device metadata with the user identifier.

Example 9 includes a computer readable storage medium comprising instructions which, when executed, cause programmable circuitry to at least cache a first ordered list of internet protocol (IP) addresses in a domain name system (DNS) cache, cache a second ordered list of IP addresses in the DNS cache, access a first server identifier from a server associated with the first ordered list of IP addresses, access a second server identifier from a second server associated with the second ordered list of IP addresses, generate a user identifier based on the first and second server identifiers, and store the user identifier as a cookie.

Example 10 includes the computer readable storage medium of example 9, wherein the instructions are to cause the programmable circuitry to retrieve the first ordered list of IP addresses based on a first DNS resolution of a first domain name operated by the AME.

Example 11 includes the computer readable storage medium of any of the previous examples, wherein the instructions are to cause the programmable circuitry to retrieve the second ordered list of IP addresses based on a second DNS resolution of a second domain name operated by the AME.

Example 12 includes the computer readable storage medium of any of the previous examples, wherein the first ordered list of IP addresses is a randomly ordered list of AME IP addresses associated with the first domain name.

Example 13 includes the computer readable of any of the previous examples, wherein the cookie is assigned a first time-to-live based on a second time-to-live of the first DNS resolution, the first time-to-live value to identify a duration the cookie is valid.

Example 14 includes the computer readable of any of the previous examples, wherein the instructions are to cause the programmable circuitry to execute the instructions to concatenate the first server identifier and the second server identifier to generate an alphanumeric string for the hash.

Example 15 includes the computer readable of any of the previous examples, wherein the first server identifier and the second server identifier are universally unique identifiers obtained in an HTTP response.

Example 16 includes the computer readable of any of the previous examples, wherein the instructions are to cause the programmable circuitry to associate device metadata with the user identifier.

Example 17 includes the computer readable of any of the previous examples, wherein the instructions, when executed, cause the processor circuitry to match the user identifier to an AME panelist.

Example 18 includes a method comprising caching, by executing an instruction with processor circuitry, a first ordered list of internet protocol (IP) addresses in a domain name system (DNS) cache, caching, by executing an instruction with the processor circuitry, a second ordered list of IP addresses in the DNS cache, accessing, by executing an instruction with the processor circuitry, a first server identifier from a first server associated with the first ordered set of IP addresses, accessing, by executing an instruction with the processor circuitry, a second server identifier from a second server associated with the second ordered list of IP addresses, hashing, by executing an instruction with the processor circuitry, the first and second server identifiers to generate a user identifier, and storing, by executing an instruction with the processor circuitry, the user identifier as a cookie.

Example 19 includes the method of example 18, further including retrieving the first ordered list of IP addresses based on a first DNS resolution of a first domain name operated by the AME.

Example 20 includes the method of any of the previous examples, further including retrieving the second ordered list of IP addresses based on a second DNS resolution of a second domain name operated by the AME.

Example 21 includes the method of any of the previous examples, wherein the first ordered list of IP addresses is a randomly ordered list of AME IP addresses associated with the first domain name.

Example 22 includes the method of any of the previous examples, wherein the cookie is assigned a first time-to-live based on a second time-to-live of the first DNS resolution, the first time-to-live value to identify a duration the cookie is valid.

Example 23 includes the method of any of the previous examples, further including concatenating the first server identifier and the second server identifier to generate an alphanumeric string for the hash.

Example 24 includes the method of any of the previous examples, wherein the first server identifier and the second server identifier as universally unique identifiers obtained from an HTTP response.

Example 25 includes the method of any of the previous examples, further including associating device metadata with the user identifier.

The following claims are hereby incorporated into this Detailed Description by this reference. Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

What is claimed is:

1. A system comprising:
a processor; and
a non-transitory computer-readable storage medium, having stored thereon program instructions that, upon execution by the processor cause performance of a set of operations comprising:
cache a first ordered list of internet protocol (IP) addresses in a domain name system (DNS) cache;
cache a second ordered list of IP addresses in the DNS cache;
access a first server identifier from a first server associated with the first ordered set of IP addresses;
access a second server identifier from a second server associated with the second ordered list of IP addresses;
hash the first and second server identifiers to generate a user identifier, wherein the programmable circuitry is to concatenate the first server identifier and the second server identifier to generate an alphanumeric string for the hash;
store, in a browser, the user identifier as a first-party cookie that tracks browser requests for DNS resolution of the first ordered set of IP addresses and the second ordered set of IP addresses; and
transmit batched impression information based on tracking information associated with the first-party cookie to an audience measurement entity (AME).

2. The system of claim 1, wherein the set of operations further comprising retrieve the first ordered list of IP addresses based on a first DNS resolution of a first domain name operated by an audience measurement entity (AME).

3. The system of claim 2, wherein the set of operations further comprising retrieve the second ordered list of IP addresses based on a second DNS resolution of a second domain name operated by the AME.

4. The system of claim 2, wherein the first ordered list of IP addresses is a randomly ordered list of AME IP addresses associated with the first domain name.

5. The system of claim 2, wherein the first-party cookie is assigned a first time-to-live value based on a second time-to-live value of the first DNS resolution, the first time-to-live value to identify a duration the first-party cookie is valid.

6. The system of claim 1, wherein the set of operations further comprising access the first server identifier and the second server identifier as universally unique identifiers obtained from an HTTP response.

7. The system of claim 1, wherein the set of operations further comprising associate device metadata with the user identifier.

8. A non-transitory computer readable storage medium comprising instructions which, when executed, cause programmable circuitry to at least:
cache a first ordered list of internet protocol (IP) addresses in a domain name system (DNS) cache;
cache a second ordered list of IP addresses in the DNS cache;
access a first server identifier from a server associated with the first ordered list of IP addresses;
access a second server identifier from a second server associated with the second ordered list of IP addresses;
generate a user identifier based on the first and second server identifiers, wherein the instructions are to cause the programmable circuitry to execute the instructions to concatenate the first server identifier and the second server identifier to generate an alphanumeric string for the generation of the user identifier; and
store, in a browser, the user identifier as a first-party cookie that tracks browser requests for DNS resolution of the first ordered set of IP addresses and the second ordered set of IP addresses; and
transmit batched impression information based on tracking information associated with the first-party cookie to an audience measurement entity (AME).

9. The non-transitory computer readable storage medium of claim 8, wherein the instructions are to cause the programmable circuitry to retrieve the first ordered list of IP addresses based on a first DNS resolution of a first domain name operated by an audience measurement entity (AME).

10. The non-transitory computer readable storage medium of claim 9, wherein the instructions are to cause the programmable circuitry to retrieve the second ordered list of IP addresses based on a second DNS resolution of a second domain name operated by the AME.

11. The non-transitory computer readable storage medium of claim 9, wherein the first ordered list of IP addresses is a randomly ordered list of AME IP addresses associated with the first domain name.

12. The non-transitory computer readable of claim 9, wherein the first-party cookie is assigned a first time-to-live based on a second time-to-live of the first DNS resolution, the first time-to-live value to identify a duration the first-party cookie is valid.

13. The non-transitory computer readable of claim 8, wherein the first server identifier and the second server identifier are universally unique identifiers obtained in an HTTP response.

14. The non-transitory computer readable of claim 8, wherein the instructions are to cause the programmable circuitry to associate device metadata with the user identifier.

15. The non-transitory computer readable of claim 8, wherein the instructions are to cause the programmable circuitry to match the user identifier to an AME panelist.

16. A method comprising:
caching, by executing an instruction with processor circuitry, a first ordered list of internet protocol (IP) addresses in a domain name system (DNS) cache;
caching, by executing an instruction with the processor circuitry, a second ordered list of IP addresses in the DNS cache;

accessing, by executing an instruction with the processor circuitry, a first server identifier from a first server associated with the first ordered set of IP addresses;

accessing, by executing an instruction with the processor circuitry, a second server identifier from a second server associated with the second ordered list of IP addresses;

hashing, by executing an instruction with the processor circuitry, the first and second server identifiers to generate a user identifier; and storing, by executing an instruction with the processor circuitry and in a browser, the user identifier as a first-party cookie that tracks browser requests for DNS resolution of the first ordered set of IP addresses and the second ordered set of IP addresses; and, transmitting batched impression information based on tracking information associated with the first-party cookie to an audience measurement entity (AME).

17. The method of claim 16, further including retrieving the second ordered list of IP addresses based on a second DNS resolution of a second domain name operated by an audience measurement entity (AME).

18. The method of claim 16, further including retrieving the first ordered list of IP addresses based on a first DNS resolution of a first domain name operated by an audience measurement entity (AME).

19. The method of claim 18, wherein the first ordered list of IP addresses is a randomly ordered list of AME IP addresses associated with the first domain name.

20. The method of claim 18, wherein the first-party cookie is assigned a first time-to-live based on a second time-to-live of the first DNS resolution, the first time-to-live value to identify a duration the first-party cookie is valid.

21. The method of claim 16, wherein the first server identifier and the second server identifier as universally unique identifiers obtained from an HTTP response.

22. The method of claim 16, further including associating device metadata with the user identifier.

* * * * *